(12) United States Patent
Kumano et al.

(10) Patent No.: US 11,667,281 B2
(45) Date of Patent: Jun. 6, 2023

(54) VEHICLE CONTROL METHOD, VEHICLE CONTROL DEVICE, AND STORAGE MEDIUM

(71) Applicant: HONDA MOTOR CO., LTD., Tokyo (JP)

(72) Inventors: Takayasu Kumano, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 17/213,267

(22) Filed: Mar. 26, 2021

(65) Prior Publication Data

US 2021/0300351 A1 Sep. 30, 2021

(30) Foreign Application Priority Data

Mar. 31, 2020 (JP) .............................. JP2020-063527

(51) Int. Cl.
| | |
|---|---|
| *B60W 10/04* | (2006.01) |
| *B60W 10/18* | (2012.01) |
| *B60W 10/20* | (2006.01) |
| *B60W 30/12* | (2020.01) |
| *B60W 50/14* | (2020.01) |
| *B60W 60/00* | (2020.01) |
| *B60W 30/09* | (2012.01) |
| *B60W 30/18* | (2012.01) |

(52) U.S. Cl.
CPC ...... *B60W 30/09* (2013.01); *B60W 30/18163* (2013.01); *B60W 10/04* (2013.01); *B60W 10/18* (2013.01); *B60W 10/20* (2013.01); *B60W 2420/42* (2013.01); *B60W 2420/52* (2013.01); *B60W 2554/4041* (2020.02); *B60W 2556/50* (2020.02)

(58) Field of Classification Search
CPC ........... B60W 30/09; B60W 30/18163; B60W 10/04; B60W 10/18; B60W 10/20; B60W 2420/42; B60W 2420/52; B60W 2554/4041; B60W 2556/50; B60W 30/12; B60W 50/14; B60W 60/001; B60W 60/0011; B60W 60/0027
USPC ......................................................... 701/26
See application file for complete search history.

(56) References Cited

U.S. PATENT DOCUMENTS

| | | | |
|---|---|---|---|
| 10,872,379 B1 * | 12/2020 | Nepomuceno ... | G08G 1/096775 |
| 2020/0377079 A1 * | 12/2020 | Sung ..................... | B60W 10/18 |
| 2022/0234615 A1 * | 7/2022 | Nishino ............. | B60W 60/0011 |

FOREIGN PATENT DOCUMENTS

JP       2019-108124       7/2019

\* cited by examiner

*Primary Examiner* — Abby Y Lin
*Assistant Examiner* — Hossam M Abd El Latif
(74) *Attorney, Agent, or Firm* — Amin, Turocy & Watson, LLP

(57) ABSTRACT

A vehicle control method includes recognizing an object, generating a target trajectory of a vehicle, and automatically controlling driving of the vehicle on the basis of the target trajectory, calculating a region between a first virtual line, which passes through a reference point using the vehicle as a reference and a first point present in the vicinity of an outer edge of the object, and a second virtual line, which passes through the reference point and a second point present in the vicinity of the outer edge of the object, as a region through which the vehicle should avoid to travel, and excluding the target trajectory present in the traveling avoidance region, and automatically controlling the driving of the vehicle on the basis of a remaining target trajectory remained without being excluded.

10 Claims, 16 Drawing Sheets

VEHICLE CONTROL METHOD, VEHICLE CONTROL DEVICE, AND STORAGE MEDIUM

CROSS-REFERENCE TO RELATED APPLICATION

Priority is claimed on Japanese Patent Application No. 2020-063527, filed Mar. 31, 2020, the content of which is incorporated herein by reference.

BACKGROUND OF THE INVENTION

Field of the Invention

The present invention relates to a vehicle control method, a vehicle control device, and a storage medium.

Description of Related Art

A technology of generating a target trajectory along which a vehicle is to travel in the future is known (for example, Japanese Unexamined Patent Application, First Publication No. 2019-108124).

SUMMARY OF THE INVENTION

However, in the related art, in some cases, target trajectories that do not match the surrounding conditions may be generated. As a result, driving of the vehicle may not be safely controlled.

An aspect of the present invention is directed to providing a vehicle control method, a vehicle control device, and a storage medium that are capable of controlling driving of a vehicle more safely.

A vehicle control method, a vehicle control device, and a storage medium according to the present invention employ the following configurations.

A first aspect of the present invention is a vehicle control method, including: recognizing an object present around a vehicle; generating one or a plurality of target trajectories along which the vehicle is to travel on the basis of the recognized object; automatically controlling driving of the vehicle on the basis of the generated target trajectory; calculating a region between a first virtual line, which passes through a reference point using the vehicle as a reference and a first point present in the vicinity of an outer edge of the recognized object, and a second virtual line, which passes through the reference point and a second point present in the vicinity of the outer edge of the object and different from the first point, as a traveling avoidance region that is a region through which traveling of the vehicle should be avoided, and excluding the target trajectory present in the calculated traveling avoidance region from the one or the plurality of target trajectories that were generated; and automatically controlling the driving of the vehicle on the basis of a remaining target trajectory remained without being excluded.

According to a second aspect, in the first aspect, the vehicle control method further includes: optimizing shapes of the first virtual line and the second virtual line on the basis of model prediction control.

According to a third aspect, in the first or second aspect, the vehicle control method further includes calculating a risk region that is a region of a risk distributed around the object, and inputting the risk region to a model that determines the target trajectory according to the risk region, and generating the one or the plurality of target trajectories on the basis of an output result of the model to which the risk region has been input.

According to a fourth aspect, in the third aspect, the model is a machine learning model learned to output the target trajectory when the risk region is input.

According to a fifth aspect, in the third or fourth aspect, the vehicle control method further includes setting a position at which a potential of the risk is lower than a threshold in the vicinity of the outer edge of the object in the risk region as the first point and the second point.

According to a sixth aspect, in any one of the first to fifth aspects, when the object recognized by the recognition part is a preceding vehicle that is traveling in front of the vehicle in a lane on which the vehicle is present, a setting of a region behind the preceding vehicle as the traveling avoidance region is not performed.

According to a seventh aspect, in any one of the first to sixth aspects, when a lane change of the vehicle is performed, a calculation of the traveling avoidance region, and an exclusion of the target trajectory present in the traveling avoidance region from the one or the plurality of target trajectories that were generated, are performed.

An eighth aspect is a vehicle control device including: a recognition part configured to recognize an object present around a vehicle; a generating part configured to generate one or a plurality of target trajectories along which the vehicle is to travel on the basis of the object recognized by the recognition part; and a driving controller configured to automatically control driving of the vehicle on the basis of the target trajectory generated by the generating part, wherein the generating part calculates a region between a first virtual line, which passes through a reference point using the vehicle as a reference and a first point present in the vicinity of an outer edge of the object recognized by the recognition part, and a second virtual line, which passes through the reference point and a second point present in the vicinity of the outer edge of the object and different from the first point, as a traveling avoidance region that is a region through which traveling of the vehicle should be avoided, and excludes the target trajectory present in the calculated traveling avoidance region from the one or the plurality of target trajectories that were generated, and the driving controller automatically controls driving of the vehicle on the basis of a remaining target trajectory remained without being excluded by the generating part.

A ninth aspect is a program is provided to execute a computer mounted on a vehicle to: recognize an object present around the vehicle; generate one or a plurality of target trajectories along which the vehicle is to travel on the basis of the recognized object; automatically control driving of the vehicle on the basis of the generated target trajectory; calculate a region between a first virtual line, which passes through a reference point using the vehicle as a reference and a first point present in the vicinity of an outer edge of the recognized object, and a second virtual line, which passes through the reference point and a second point present in the vicinity of the outer edge of the object and different from the first point, as a traveling avoidance region that is a region through which traveling of the vehicle should be avoided, and exclude the target trajectory present in the calculated traveling avoidance region from the one or the plurality of target trajectories that were generated; and automatically control the driving of the vehicle on the basis of a remaining target trajectory remained without being excluded.

According to any one of the above-mentioned aspects, it is possible to control driving of a vehicle more safely.

DETAILED DESCRIPTION OF THE INVENTION

Hereinafter, embodiments of a vehicle control device, a vehicle control method, and a program of the present invention will be described with reference to the accompanying drawings. The vehicle control device of the embodiment is applied to, for example, an automatic traveling vehicle. Automatic traveling is, for example, controlling driving of the vehicle by controlling one or both of a speed or steering of the vehicle. The above-mentioned driving control of the vehicle includes various types of driving control, for example, an adaptive cruise control system (ACC), a traffic jam pilot (TJP), auto lane changing (ALC), a collision mitigation brake system (CMBS) or a lane keeping assistance system (LKAS). Driving of the automatic traveling vehicle may be controlled by manual driving of an occupant (a driver).

[Entire Configuration]

Figure 1:
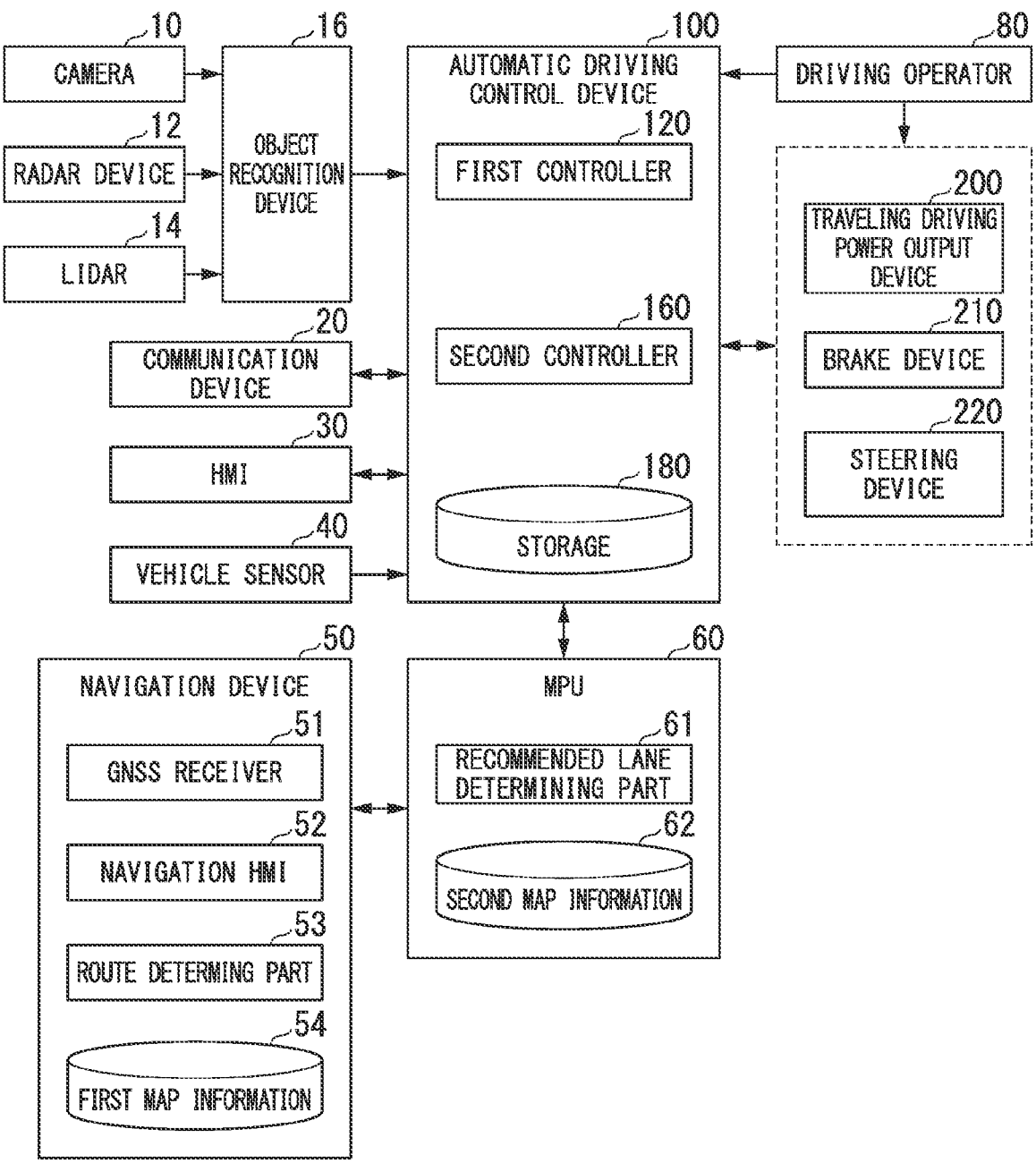
FIG. 1 is a configuration view of a vehicle system using a vehicle control device according to an embodiment.

FIG. 1 is a configuration view of a vehicle system 1 using a vehicle control device according to the embodiment. A vehicle on which the vehicle system 1 is mounted (hereinafter, referred to as a host vehicle M) is, for example, a two-wheeled, three-wheeled, or four-wheeled vehicle, and a driving source thereof is an internal combustion engine such as a diesel engine, a gasoline engine, or the like, an electric motor, or a combination of these. The electric motor is operated using an output generated by a generator connected to the internal combustion engine, or discharged energy of a secondary battery or a fuel cell.

The vehicle system 1 includes, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automatic driving control device 100, a traveling driving power output device 200, a brake device 210, and a steering device 220. These devices or instruments are connected to each other by a multiple communication line such as a controller area network (CAN) communication line or the like, a serial communication line, a wireless communication network, or the like. The configuration shown in FIG. 1 is merely an example, a part of the configuration may be omitted, and another configuration may be added. The automatic driving control device 100 is an example of "a vehicle control device."

The camera 10 is, for example, a digital camera using a solid-state image sensing device such as a charge coupled device (CCD), a complementary metal oxide semiconductor (CMOS), or the like. The camera 10 is attached to an arbitrary place of the host vehicle M. For example, when a side in front of the host vehicle M is imaged, the camera 10 is attached to an upper section of a front windshield, a rear surface of a rearview mirror, or the like. In addition, when a side behind the host vehicle M is imaged, the camera 10 is attached to an upper section of a rear windshield, or the like. In addition, when the right side or the left side of the host vehicle M is imaged, the camera 10 is attached to a right side surface or a left side surface of a vehicle body or a door mirror. The camera 10 images surroundings of the host vehicle M, for example, periodically and repeatedly. The camera 10 may be a stereo camera.

The radar device 12 radiates radio waves such as millimeter waves or the like to surroundings of the host vehicle M, and simultaneously, detects the radio waves (reflected waves) reflected by the object to detect a position (a distance and an azimuth) of at least the object. The radar device 12 is attached to an arbitrary place of the host vehicle M. The radar device 12 may detect a position and a speed of the object using a frequency modulated continuous wave (FM-CW) method.

The LIDAR 14 radiates light to surroundings of the host vehicle M, and measures the scattered light of the radiated light. The LIDAR 14 detects a distance to a target on the basis of a time from emission to reception of light. The radiated light is, for example, a pulse-shaped laser beam. The LIDAR 14 is attached to an arbitrary place of the host vehicle M.

The object recognition device 16 recognizes a position, a type, a speed, or the like, of the object by performing sensor fusion processing with respect to the detection result by some or all of the camera 10, the radar device 12, and the LIDAR 14. The object recognition device 16 outputs the recognized result to the automatic driving control device 100. In addition, the object recognition device 16 may output the detection results of the camera 10, the radar device 12 and the LIDAR 14 directly to the automatic driving control device 100. In this case, the object recognition device 16 may be omitted from the vehicle system 1.

The communication device 20 uses, for example, a cellular network, a Wi-Fi network, a Bluetooth (registered trademark), dedicated short range communication (DSRC), or the like, comes in communication with another vehicle present in the vicinity of the host vehicle M, or comes in communication with various server devices via a radio base station.

The HMI 30 receives an input operation by an occupant in the host vehicle M while providing various types of information to the occupant (including a driver). The HMI 30 may include, for example, a display, a speaker, a buzzer, a touch panel, a microphone, a switch, a key, or the like.

The vehicle sensor 40 includes a vehicle speed sensor configured to detect a speed of the host vehicle M, an acceleration sensor configured to detect an acceleration, a yaw rate sensor configured to detect an angular speed around a vertical axis, and an azimuth sensor configured to detect an orientation of the host vehicle M.

The navigation device 50 includes, for example, a global navigation satellite system (GNSS) receiver 51, a navigation HMI 52, and a route determining part 53. The navigation device 50 holds first map information 54 in a storage device such as a hard disk drive (HDD) a flash memory, or the like.

The GNSS receiver 51 specifies a position of the host vehicle M on the basis of a signal received from the GNSS satellite. The position of the host vehicle M may be specified or complemented by an inertial navigation system (INS) that uses output of the vehicle sensor 40.

The navigation HMI 52 includes a display device, a speaker, a touch panel, a key, and the like. The navigation HMI 52 may be partially or entirely shared with the HMI 30 described above. For example, the occupant may input a destination of the host vehicle M to the navigation HMI 52 instead of (or in addition to) inputting the destination of the host vehicle M to the HMI 30.

The route determining part 53 determines, for example, a route (hereinafter, a route on a map) from a position of the host vehicle M specified by the GNSS receiver 51 (or an input arbitrary position) to a destination input by an occupant using the HMI 30 or the navigation HMI 52 with reference to the first map information 54.

The first map information 54 is, for example, information in which a road shape is expressed by a link showing a road and a node connected by the link. The first map information 54 may include a curvature of a road, point of interest (POI) information, or the like. The route on a map is output to the MPU 60.

The navigation device 50 may perform route guidance using the navigation HMI 52 on the basis of the route on a map. The navigation device 50 may be realized by, for example, a function of a terminal device such as a smart phone, a tablet terminal, or the like, held by the occupant. The navigation device 50 may transmit the current position and the destination to the navigation server via the communication device 20, and acquire the same route as the route on a map from the navigation server.

The MPU 60 includes, for example, a recommended lane determining part 61, and holds second map information 62 in a storage device such as an HDD, a flash memory, or the like. The recommended lane determining part 61 divides the route on a map provided from the navigation device 50 into a plurality of blocks (for example, divided at each 100 [m] in an advance direction of the vehicle), and determines a recommended lane at each block with reference to the second map information 62. The recommended lane determining part 61 performs determination of which lane the vehicle travels from the left. The recommended lane determining part 61 determines a recommended lane such that the host vehicle M can travel a reasonable route so as to reach a branch destination when a diverging place is present on the route on a map.

The second map information 62 is map information that has a higher precision than the first map information 54. The second map information 62 includes, for example, information of a center of a lane, information of a boundary of a lane, or the like. In addition, the second map information 62 may include road information, traffic regulation information, address information (address/zip code), facility information, telephone number information, and the like. The second map information 62 may be updated at any time by bringing the communication device 20 in communication with another device.

The driving operator 80 includes, for example, an acceleration pedal, a brake pedal, a shift lever, a steering wheel, a modified steer, a joystick, and other operators. A sensor configured to detect an operation amount or existence of an operation is attached to the driving operator 80, and the detection result is output to some or all of the automatic driving control device 100, the traveling driving power output device 200, the brake device 210, and the steering device 220.

The automatic driving control device 100 includes, for example, a first controller 120, a second controller 160, and a storage 180. The first controller 120 and the second controller 160 are realized by executing a program (software) using a hardware processor such as a central processing unit (CPU), a graphics processing unit (GPU) or the like. Some or all of these components may be realized by hardware (a circuit part; including a circuitry) such as large scale integration (LSI), an application specific integrated circuit (ASIC), a field-programmable gate array (FPGA), or the like, or may be realized by cooperation of software and hardware. The program may be previously stored in a storage device (a storage device including a non-transient storage medium) such as an HDD, a flash memory, or the like, of the automatic driving control device 100, stored in a detachable storage medium such as a DVD, a CD-ROM, or the like, or installed on an HDD or a flash memory of the automatic driving control device 100 by mounting a storage medium (a non-transient storage medium) on a drive device.

The storage 180 is realized by the above-mentioned various types of storage devices. The storage 180 is realized by, for example, an HDD, a flash memory, an electrically erasable programmable read only memory (EEPROM), a read only memory (ROM), a random access memory (RAM), or the like. Deep neural network (DNN(s)) model data 182 or the like is stored in the storage 180, for example, in addition to the program read and executed by the processor. The DNN model data 182 will be described below in detail.

Figure 2:
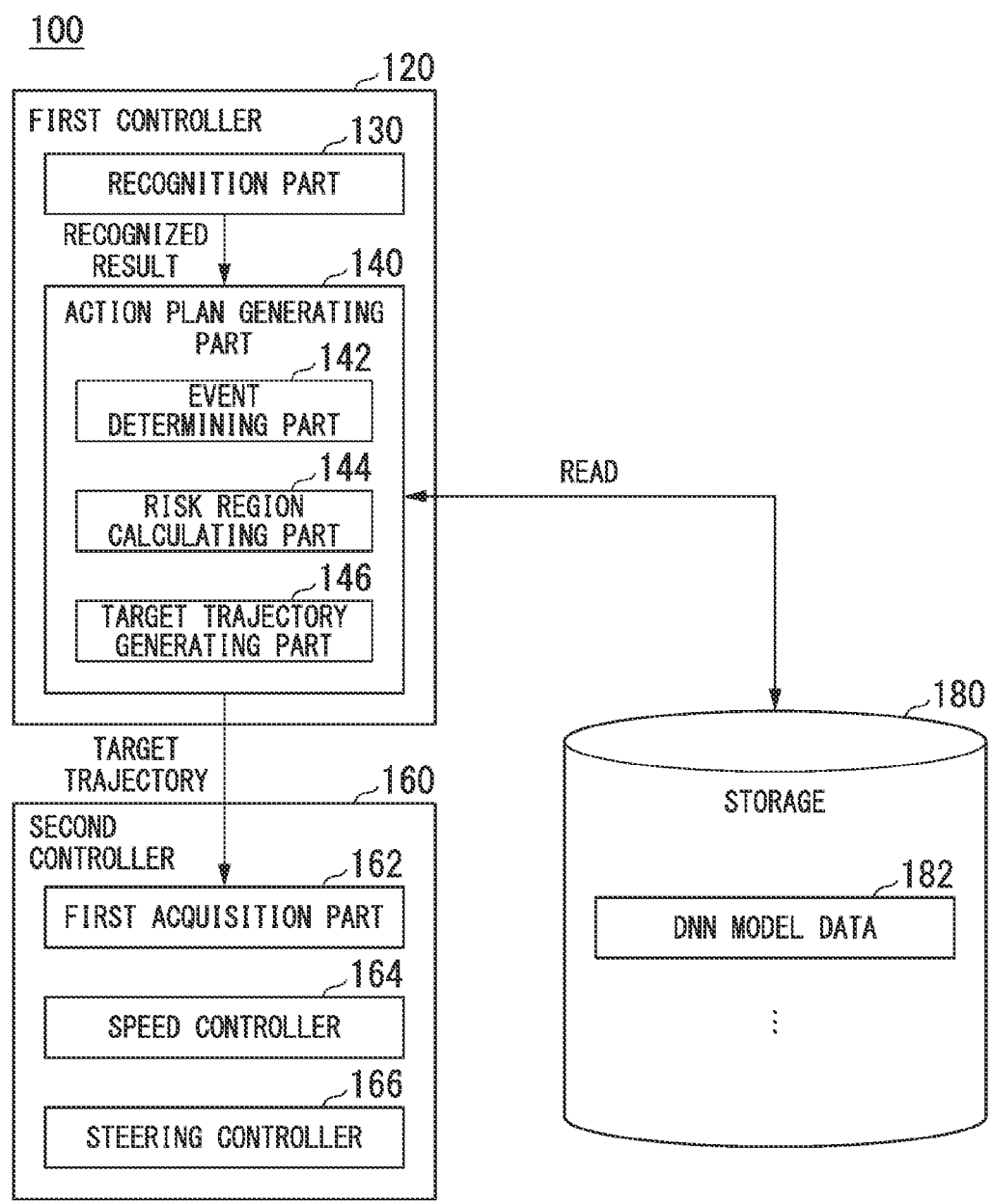
FIG. 2 is a functional configuration view of a first controller, a second controller, and a storage according to the embodiment.

FIG. 2 is a functional configuration view of the first controller 120, the second controller 160 and the storage 180 according to the embodiment. The first controller 120 includes, for example, a recognition part 130 and an action plan generating part 140.

The first controller 120 realizes, for example, both of a function of artificial intelligence (AI) and a function of a previously provided model at the same time. For example, a function of "recognizing a crossroad" is executed parallel to recognition of a crossroad through deep learning or the like and recognition based on a previously provided condition (a signal that enables matching of patterns, road markings, or the like), and may be realized by scoring and comprehensively evaluating them. Accordingly, reliability of automatic driving is guaranteed.

The recognition part 130 recognizes a situation or an environment of surroundings of the host vehicle M. For example, the recognition part 130 recognizes an object present around the host vehicle M on the basis of information input from the camera 10, the radar device 12, and the LIDAR 14 via the object recognition device 16. The object recognized by the recognition part 130 includes, for example, a bicycle, a motorcycle, a four-wheeled automobile, a pedestrian, road signs, road markings, road marking lines, electric poles, a guardrail, falling objects, or the like. In addition, the recognition part 130 recognizes a state such as a position, a speed, an acceleration, or the like, of the object. The position of the object is recognized as a position on relative coordinates (i.e., a relative position with respect to the host vehicle M) using, for example, a representative point (a center of gravity, a driving axial center, or the like) of the host vehicle M as an origin, and is used for control. The position of the object may be displayed at a representative point such as a center of gravity, a corner, or the like, of the object, or may be displayed as an expressed region. The "state" of the object may include an acceleration, a jerk, or "an action state" (for example, whether a lane change is performed or to be performed) of the object.

In addition, the recognition part 130 recognizes, for example, a lane in which the host vehicle M is traveling (hereinafter, a host lane), a neighboring lane adjacent to the host lane, or the like. For example, the recognition part 130 recognizes a space between road marking lines as a host lane or a neighboring lane by comparing a pattern (for example, arrangement of solid lines and broken lines) of road marking lines obtained from the second map information 62 with a pattern of road marking lines around the host vehicle M recognized from an image captured by the camera 10.

In addition, the recognition part 130 may recognize a lane such as a host lane or a neighboring lane by recognizing traveling lane boundaries (road boundaries) including road marking lines, road shoulders, curbstones, median strips, guardrails, and the like, while not being limited to road marking lines. In the recognition, the position of the host vehicle M acquired from the navigation device 50 or a processing result by the INS may be added. In addition, the recognition part 130 may recognize a temporary stop line, an obstacle, a red signal, a tollgate, and other road events.

The recognition part 130 recognizes a relative position or an attitude of the host vehicle M with respect to the host lane when the host lane is recognized. The recognition part 130 may recognize a separation from a lane center of a reference point of the host vehicle M and an angle of the host vehicle M with respect to a line that connects a lane center in an advance direction as a relative position and an attitude of the host vehicle M with respect to the host lane. Instead of this, the recognition part 130 may recognize a position or the like of a reference point of the host vehicle M with respect to any side end portion (a road marking line or a road boundary) of the host lane as a relative position of the host vehicle M with respect to the host lane.

The action plan generating part 140 includes, for example, an event determining part 142, a risk region calculating part 144 and a target trajectory generating part 146.

The event determining part 142 determines a traveling aspect of automatic traveling when the host vehicle M is automatically traveling on a route in which a recommended lane is determined. Hereinafter, information that defines a traveling aspect of the automatic traveling will be described while being referred to as an event.

The event includes, for example, a fixed speed traveling event, a following traveling event, a lane change event, a diverging event, a merging event, a take-over event, or the like. The fixed speed traveling event is a traveling aspect of causing the host vehicle M to travel along the same lane at a fixed speed. The following traveling event is a traveling aspect of causing the host vehicle M to follow another vehicle present within a predetermined distance in front of the host vehicle M on the host lane (for example, within 100 [m]) and closest to the host vehicle M (hereinafter, referred to as a preceding vehicle).

"Following" may be, for example, a traveling aspect of maintaining a constant inter-vehicle distance (a relative distance) between the host vehicle M and a preceding vehicle, or may be a traveling aspect of causing the host vehicle M to travel along a center of the host lane, in addition to maintaining a constant inter-vehicle distance between the host vehicle M and the preceding vehicle.

The lane change event is a traveling aspect of causing the host vehicle M to change lanes from the host lane to a neighboring lane. The diverging event is a traveling aspect of causing the host vehicle M to move to a lane on the side of the destination at a diverging point of the road. The merging event is a traveling aspect of causing the host vehicle M to join a main line at a merging point. The take-over event is a traveling aspect of terminating automatic traveling and switching automatic driving to manual driving.

In addition, the event may include, for example, an overtaking event, an avoiding event, or the like. The overtaking event is a traveling aspect of causing the host vehicle M to change lane to a neighboring lane temporarily, overtake the preceding vehicle in the neighboring lane and change lane to the original lane again. The avoiding event is a traveling aspect of causing the host vehicle M to perform at least one of braking and steering to avoid an obstacle present in front of the host vehicle M.

In addition, for example, the event determining part 142 may change the event already determined with respect to the current section to another event, or determine a new event with respect to the current section according to a situation of the surroundings recognized by the recognition part 130 when the host vehicle M is traveling.

The risk region calculating part 144 calculates a risk region potentially distributed or present around the object recognized by the recognition part 130 (hereinafter, referred to as a risk region RA). The risk is, for example, a risk that an object exerts an influence on the host vehicle M. More specifically, the risk may be a risk of the host vehicle M being caused to brake suddenly because a preceding vehicle has suddenly slowed down or another vehicle has cut in front of the host vehicle M from a neighboring lane, or may be a risk of the host vehicle M being forced to be steered suddenly because a pedestrian or a bicycle has entered the roadway. In addition, the risk may be a risk that the host vehicle M will exert an influence on the object. Hereinafter, the level of such risk is treated as a quantitative index value, and the index value which will be described below is referred to as "a risk potential p".

Figure 3:
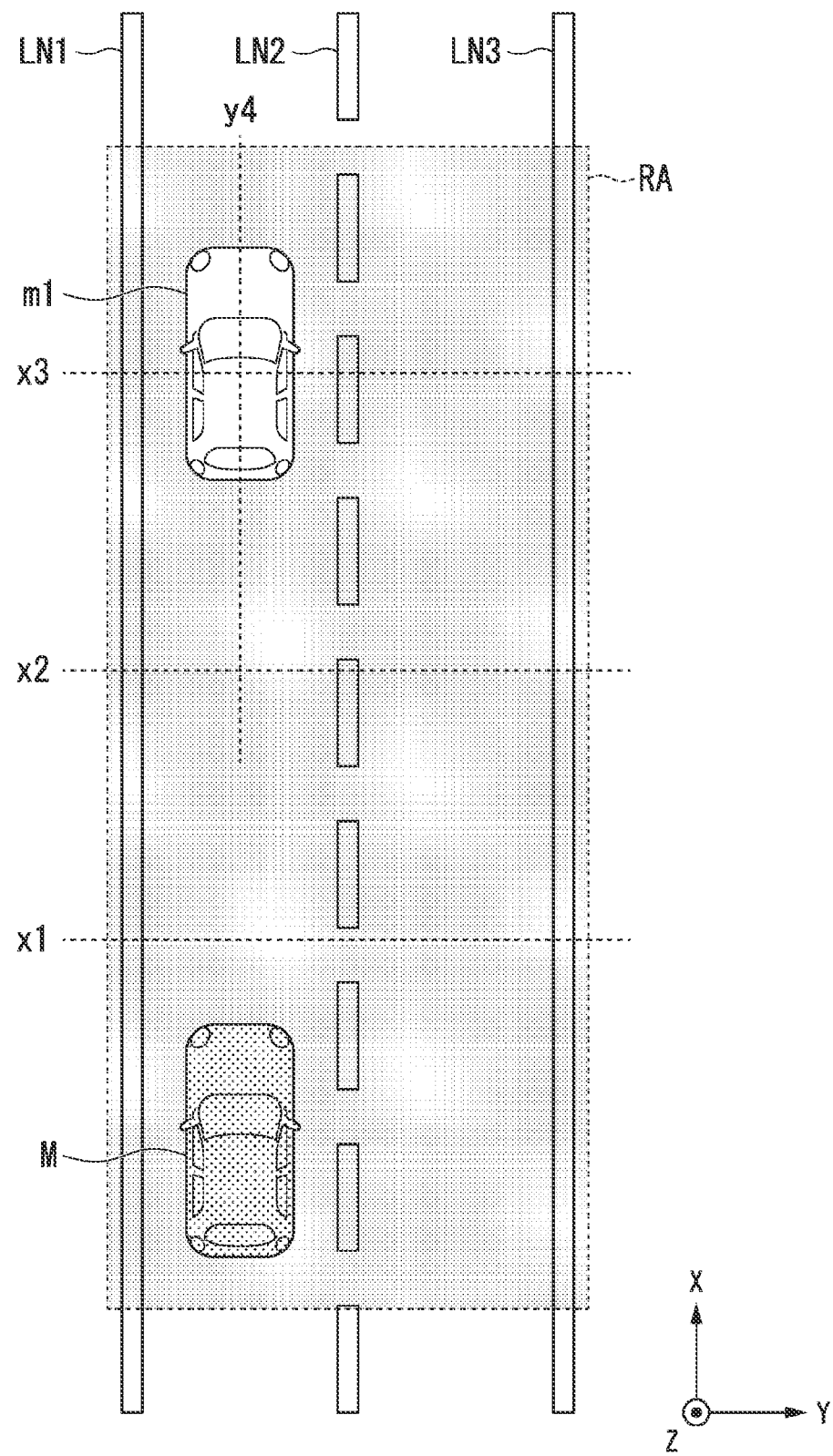
FIG. 3 is a view for describing a risk region.

FIG. 3 is a view for explaining the risk region RA. LN1 in the drawing designates a road marking line that partitions off the host lane on one side, and LN2 designates a road marking line that partitions off the host lane on the other side and a road marking line that partitions off a neighboring lane on one side. LN3 designates the other road marking line that divides the neighboring lane. In the plurality of road marking lines, LN1 and LN3 designate roadway edge markings, and LN2 designates a center line that vehicles are allowed to pass beyond when overtaking. In addition, in the example shown, a preceding vehicle m1 is present in front of the host vehicle M on the host lane. X in the drawing designates a direction in which the vehicle is advancing, Y designates a widthwise direction of the vehicle, and Z designates a vertical direction.

In the case of the situation shown, in the risk region RA, the risk region calculating part 144 increases the risk potential p in a region close to the roadway edge markings LN1 and LN3, and decreases the risk potential p in a region distant from the roadway edge markings LN1 and LN3.

In addition, in the risk region RA, the risk region calculating part 144 increases the risk potential p as it approaches the region close to the center line LN2 and decreases the risk potential p as it approaches the region far from the center line LN2. Since the center line LN2 is different from the roadway edge markings LN1 and LN3 and the vehicle is allowed to deviate from the center line LN2, the risk region calculating part 144 causes the risk potential p with respect to the center line LN2 to be lower than the risk potential p with respect to the roadway edge markings LN1 and LN3.

In addition, in the risk region RA, the risk region calculating part 144 increases the risk potential p as it approaches a region close to the preceding vehicle m1 that is one of an object, and decreases the risk potential p as it approaches a region far from the preceding vehicle m1. That is, in the risk region RA, the risk region calculating part 144 may increase the risk potential p as a relative distance between the host vehicle M and the preceding vehicle m1 becomes shorter, and may decrease the risk potential p as the relative distance between the host vehicle M and the preceding vehicle m1 becomes longer. Here, the risk region calculating part 144 may increase the risk potential p as an absolute speed or an absolute acceleration of the preceding vehicle m1 is increased. In addition, the risk potential p may be appropriately determined according to a relative speed or a relative acceleration between the host vehicle M and the preceding vehicle m1, a time to collision (TTC), or the like, instead of or in addition to the absolute speed or the absolute acceleration of the preceding vehicle m1.

Figure 4:
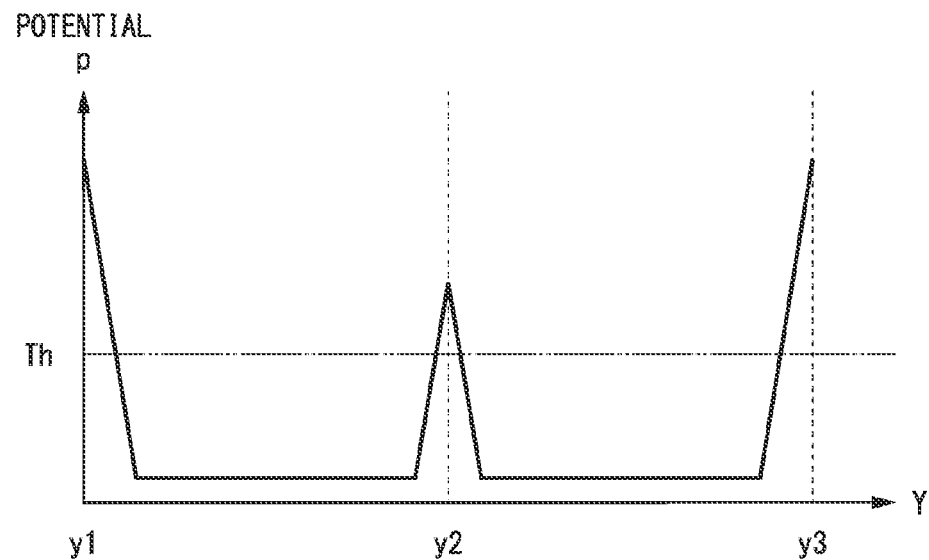
FIG. 4 is a view showing a variation in risk potential in a Y direction at a certain coordinate x1.

FIG. 4 is a view showing variation in the risk potential p in the Y direction at a certain coordinate x1. Here, y1 in the drawing designates a position (coordinate) of the roadway edge marking LN1 in the Y direction, y2 designates a position (coordinate) of the center line LN2 in the Y direction, and y3 designates a position (coordinate) of the roadway edge marking LN3 in the Y direction.

As shown, the risk potential p is highest in the vicinity of the coordinates (x1, y1) at which the roadway edge marking LN1 is present or in the vicinity of the coordinates (x1, y3) at which the roadway edge marking LN3 is present, and the risk potential p is the second highest in the vicinity of the coordinates (x1, y2) at which the center line LN2 is present after the coordinates (x1, y1) or (x1, y3). As described above, in a region in which the risk potential p is equal to or greater than a previously determined threshold Th, in order to prevent the vehicle from entering the region, the target trajectory TR is not generated.

Figure 5:
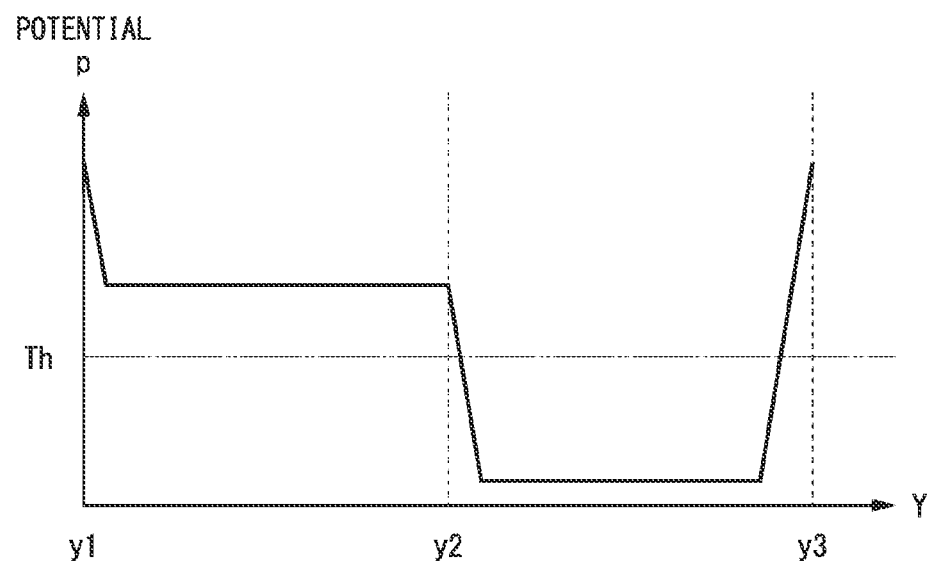
FIG. 5 is a view showing a variation in risk potential in a Y direction at a certain coordinate x2.

FIG. 5 is a view showing variation in the risk potential p in the Y direction at a certain coordinate x2. The coordinate x2 is closer to the preceding vehicle m1 than the coordinate x1 is. For this reason, although the preceding vehicle m1 is not present in the region between the coordinates (x2, y1) at which the roadway edge marking LN1 is present and the coordinates (x2, y2) at which the center line LN2 is present, a risk can be considered such as the sudden deceleration of the preceding vehicle m1 or the like. As a result, the risk potential p in the region between (x2, y1) and (x2, y2) tends to be higher than the risk potential p in the region between (x1, y1) and (x1, y2), for example, the threshold Th or more.

Figure 6:
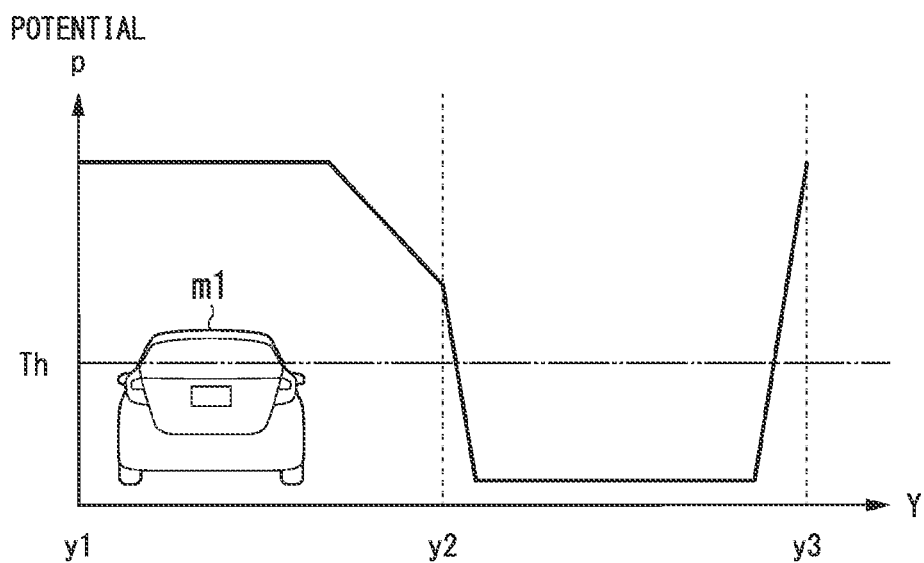
FIG. 6 is a view showing a variation in risk potential in a Y direction at a certain coordinate x3.

FIG. 6 is a view showing a variation in the risk potential p in the Y direction at a certain coordinate x3. The preceding vehicle m1 is present at the coordinate x3. For this reason, the risk potential p in the region between the coordinates (x3, y1) at which the roadway edge marking LN1 is present and the coordinates (x3, y2) at which the center line LN2 is present is higher than the risk potential p in the region between (x2, y1) and (x2, y2), and is equal to or greater than the threshold Th.

Figure 7:
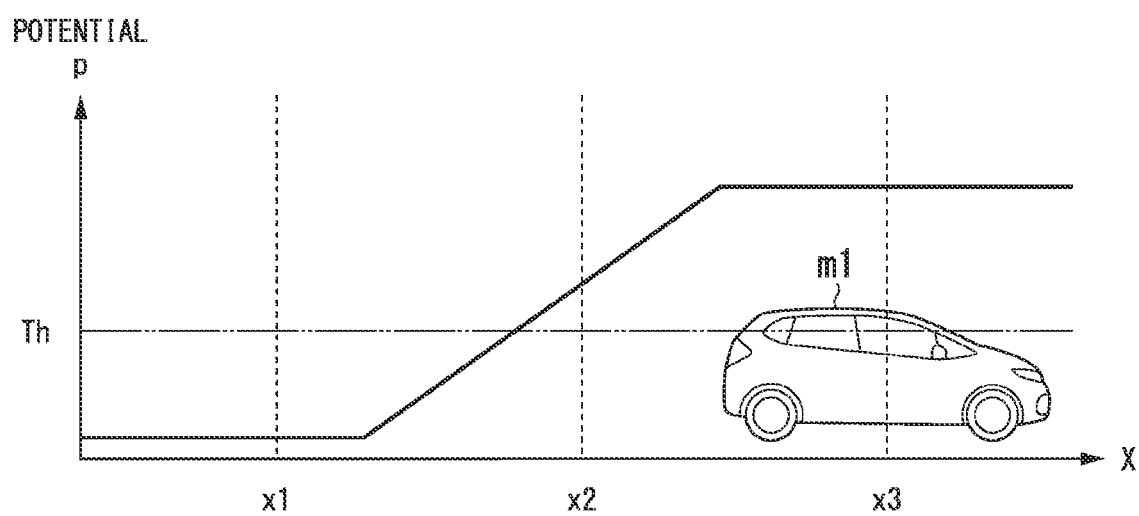
FIG. 7 is a view showing a variation in risk potential in an X direction at a certain coordinate y4.

FIG. 7 is a view showing a variation in the risk potential p in the X direction at a certain coordinate y4. The coordinate y4 is intermediate coordinates between y1 and y2, and the preceding vehicle m1 is present at the coordinate y4. For this reason, the risk potential p is highest at the coordinates (x3, y4), the risk potential p at the coordinates (x2, y4) farther from the preceding vehicle m1 than the coordinates (x3, y4) is lower than the risk potential p at the coordinates (x3, y4), and the risk potential p at the coordinates (x1, y4) farther from the preceding vehicle m1 than the coordinates (x2, y4) is lower than the risk potential p at the coordinates (x2, y4).

Figure 8:
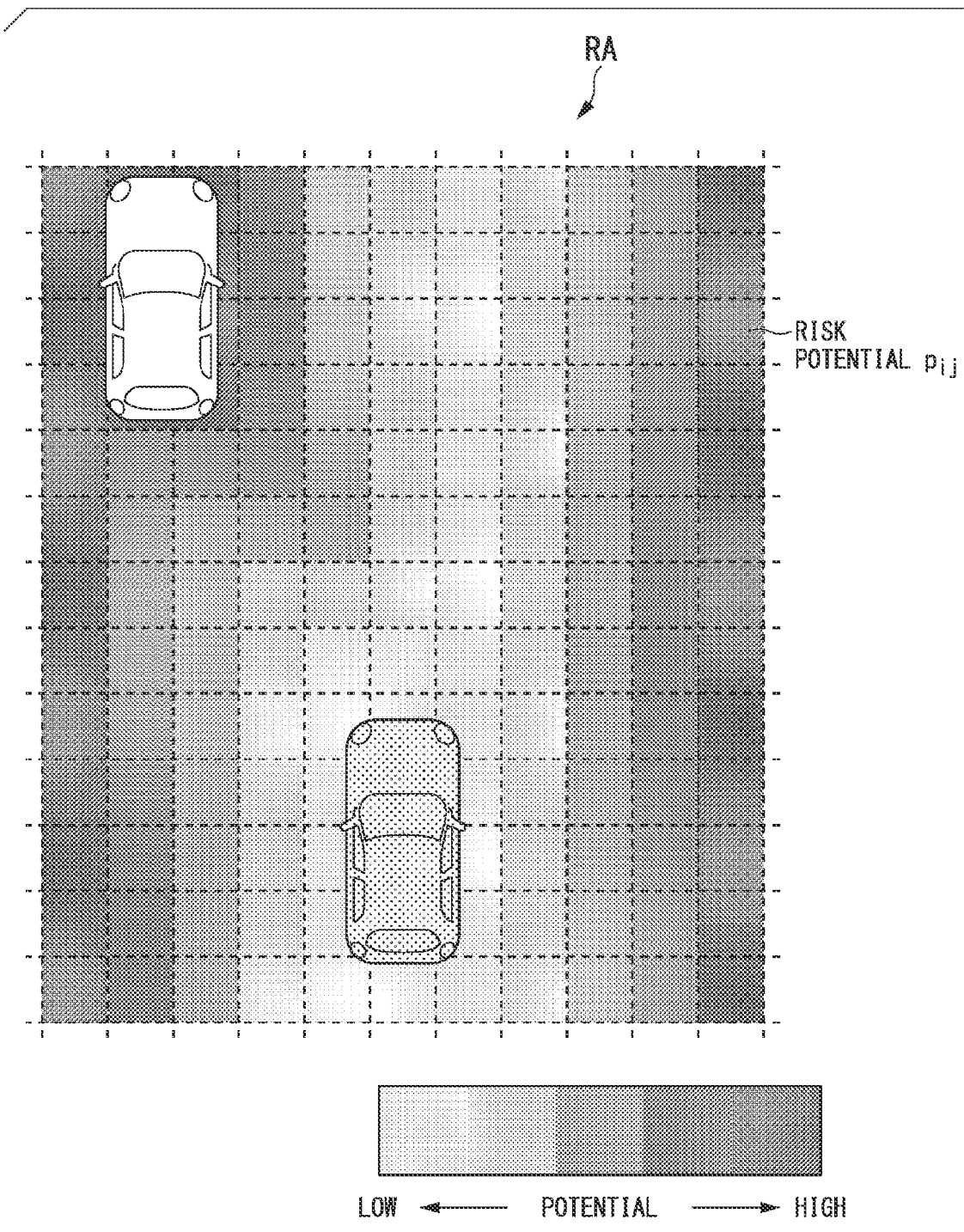
FIG. 8 is a view showing a risk region determined by a risk potential.

FIG. 8 is a view showing the risk region RA determined by the risk potential p. As shown, in the risk region calculating part 144, the risk region RA is divided into a plurality of mesh squares (also referred to as grid squares), and the risk potential p is associated with each of the plurality of mesh squares. For example, the risk potential corresponds to the mesh square $(x_i, y_i)$. That is, the risk region RA is expressed by a data structure referred to as a vector or a tensor.

The risk region calculating part 144 normalizes the risk potential p of each mesh when the risk potential p corresponds to each of the plurality of meshes.

For example, the risk region calculating part 144 may normalize the risk potential p such that the maximum value of the risk potential p is 1 and the minimum value is 0. Specifically, the risk region calculating part 144 selects the risk potential $p_{max}$ that becomes the maximum value and the risk potential $p_{min}$ that becomes the minimum value among the risk potential p of all of the meshes included in the risk region RA. The risk region calculating part 144 selects one mesh $(x_i, y_i)$ of interest from all of the meshes included in the risk region RA, subtracts the minimum risk potential $p_{min}$ from the risk potential $p_{ij}$ corresponding to the mesh $(x_i, y_i)$, subtracts the minimum risk potential $p_{min}$ from the maximum risk potential $p_{max}$, and divides $(p_{ij}-p_{min})$ by $(p_{max}-p_{min})$. The risk region calculating part 144 repeats the above-mentioned processing while changing the mesh of interest. Accordingly, the risk region RA is normalized such that the maximum value of the risk potential p is 1 and the minimum value is 0.

In addition, the risk region calculating part 144 may calculate an average value μ and a standard deviation σ of the risk potential p of all the meshes included in the risk region RA, subtract the average value μ from the risk potential $p_{ij}$ corresponding to the mesh $(x_i, y_i)$, and divide $(p_{ij}-μ)$ by the standard deviation 6. Accordingly, the risk region RA is normalized such that the maximum value of the risk potential p is 1 and the minimum value is 0.

In addition, the risk region calculating part 144 may normalize the risk potential p such that the maximum value of the risk potential p is an arbitrary M and the minimum value is an arbitrary m. Specifically, when (A, the risk region $(p_{ij}-p_{min})/(p_{max}-p_{min})$ is calculating part 144 multiplies A by (M-m), and adds m to A (M-m). Accordingly, the risk region RA is normalized such that the maximum value of the risk potential p becomes M and the minimum value becomes m.

Returning to the description in FIG. 2, the target trajectory generating part 146 generates the future target trajectory TR to allow the host vehicle M to automatically travel (independently of an operation of the driver) in the traveling aspect defined by the event, such that the host vehicle M is able to travel in the recommended lane determined by the recommended lane determining part 61, and further, the host vehicle M is able to respond to the surrounding situation when traveling in the recommended lane. The target trajectory TR includes, for example, a position element that determines the position of the host vehicle M in the future, and a speed element that has determined the speed or the like of the host vehicle M in the future.

For example, the target trajectory generating part 146 determines a plurality of points (trajectory points) at which the host vehicle M should arrive in sequence as position elements of the target trajectory TR. The trajectory point is a point at which the host vehicle M should arrive after each of predetermined traveling distances (for example, about every several [m]). The predetermined traveling distance may be calculated, for example, according to a distance along a road when traveling on a route.

In addition, the target trajectory generating part 146 determines a target speed v and a target acceleration a for every predetermined sampling time (for example, about every several fractions of a [sec]) as a speed element of the target trajectory TR. In addition, the trajectory point may be a position at which the host vehicle M is to arrive in a sampling time for every predetermined sampling time. In this case, the target speed v or the target acceleration a is determined according to an interval of the sampling times and the trajectory points.

For example, the target trajectory generating part 146 reads the DNN model data 182 from the storage 180, and generates one or a plurality of target trajectories TR using a model defined by the data.

The DNN model data 182 is information (a program or a data structure) defined by one or a plurality of DNN models MDL1. The DNN model MDL1 is a deep learning model learned to output the target trajectory TR when the risk region RA is input. Specifically, the DNN models MDL1 may be a convolutional neural network (CNN), a recurrent neural network (RNN), or a combination of these. The DNN model data 182 includes, for example, various types of information such as coupling information showing how units included in the plurality of layers constituting the neural network are coupled to each other, a coupling coefficient applied to the data input and output between the coupled units, or the like. The DNN model MDL1 is an example of "a machine learning model."

The coupling information includes, for example, information that designates the number of units included in each layer, a type of a unit of destinations of the units, or the like, and information of an activation function of each unit, a gate provided between the units of the hidden layer, or the like. The activation function may be, for example, a normalized linear function (an ReLU function), or may be a Sigmoid function, a step function, or the other functions. The gate selectively passes or weights the data transmitted between the units, for example, depending on a value (for example, 1 or 0) returned by the activation function. The coupling coefficient includes, for example, a weight coefficient given to the output data when the data is output from a unit of a certain layer to a unit of a deeper layer in the hidden layer of the neural network. In addition, the coupling coefficient may include a bias element peculiar to each layer.

The DNN model MDL1 is sufficiently learned on the basis of, for example, instructor data. The instructor data is, for example, a data set in which the target trajectory TR, which is a correct answer that the DNN model MDL1 should output, is associated with the risk region RA as an instructor label (also referred to as a target). That is, the instructor data is a data set in which the risk region RA that is input data and the target trajectory TR that is output data are combined. The target trajectory TR, which is the correct answer, may be, for example, the target trajectory that passes the mesh having the lowest risk potential p, which is less than the threshold Th, among the plurality of meshes contained in the risk region RA. In addition, the target trajectory TR, which is the correct answer, may be, for example, an actual trajectory of a vehicle driven by a driver in a certain risk region RA.

The target trajectory generating part 146 inputs the risk region RA calculated by the risk region calculating part 144 to each of the plurality of DNN models MDL1, and generates one or a plurality of target trajectories TR on the basis of the output result of the DNN models MDL1 to which the risk region RA is input.

Figure 9:
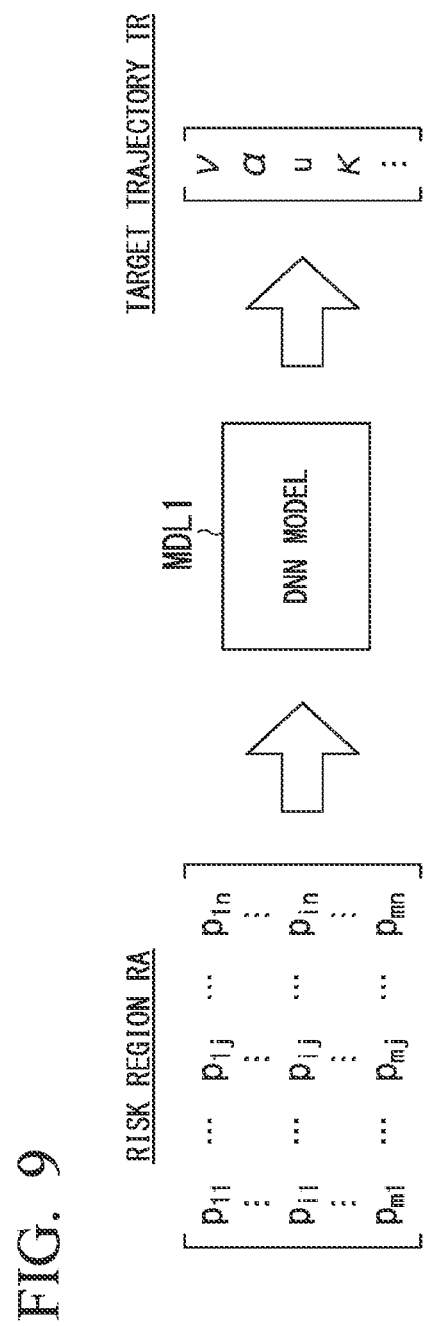
FIG. 9 is a view schematically showing a generating method of a target trajectory.

FIG. 9 is a view schematically showing a method of generating the target trajectory TR. For example, the target trajectory generating part 146 inputs a vector or a tensor representing the risk region RA to each of the plurality of DNN models MDL1. In the example shown, the risk region RA is represented as a second-order tensor with m rows and n columns. Each of the DNN models MDL1 to which the vector or the tensor representing the risk region RA is input outputs one target trajectory TR. The target trajectory TR is represented by, for example, a vector or a tensor including a plurality of elements such as a target speed v, a target acceleration a, a displacement amount u of steering, and a curvature κ of a track.

Figure 10:
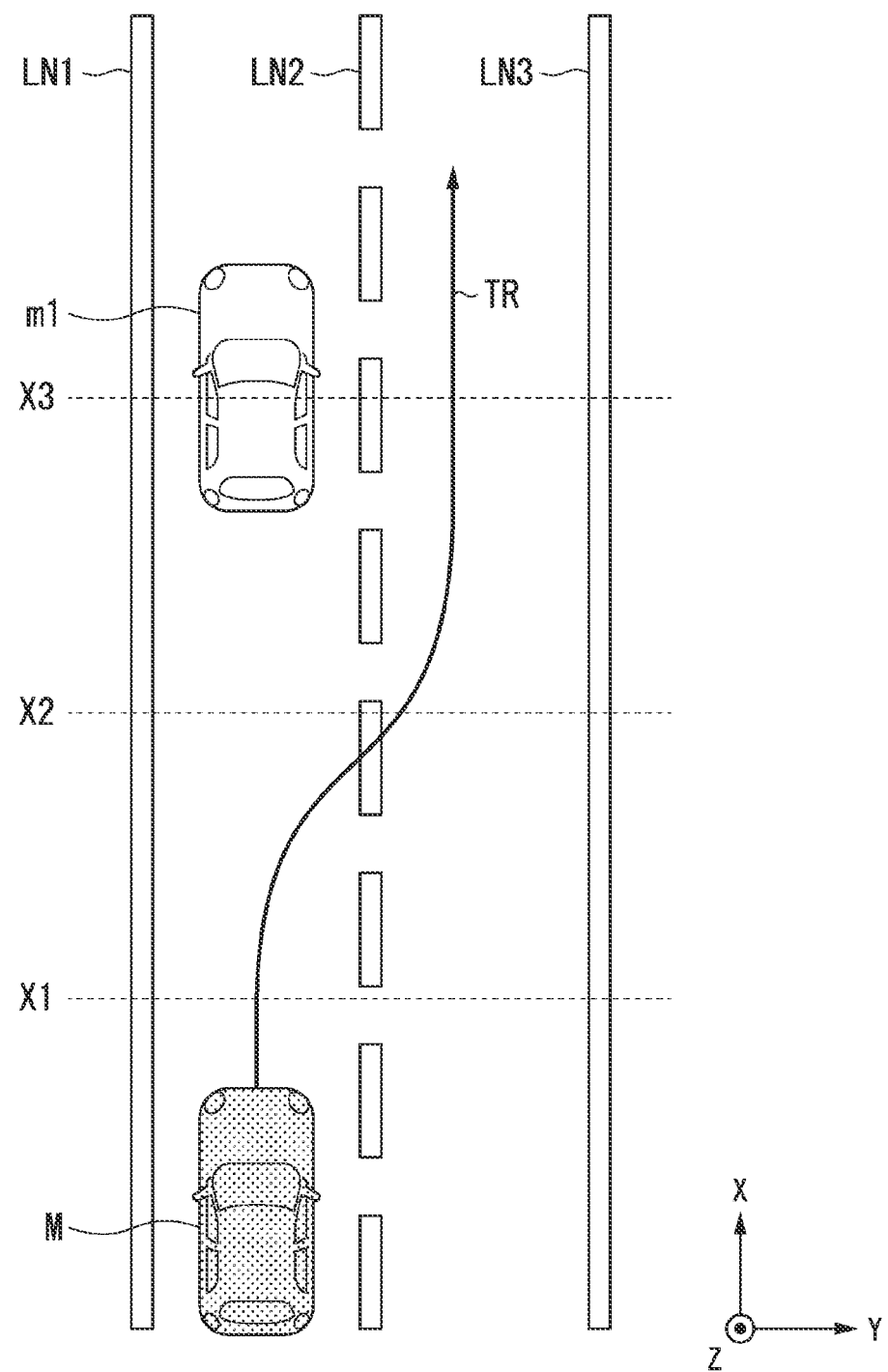
FIG. 10 is a view showing an example of a target trajectory output from a certain DNN model.

FIG. 10 is a view showing an example of the target trajectory TR output from a certain DNN model MDL1. Like the example shown, since the risk potential p around the preceding vehicle m1 is increased, the target trajectory TR is generated to avoid it. As a result, the host vehicle M changes the lane to a neighboring lane partitioned by road marking lines LN2 and LN3, and overtakes the preceding vehicle m1.

Returning to the description of FIG. 2, the second controller 160 controls the traveling driving power output device 200, the brake device 210, and the steering device 220 such that the host vehicle M passes through the target trajectory TR generated by the target trajectory generating part 146 on time as scheduled. The second controller 160 includes, for example, a first acquisition part 162, a speed controller 164 and a steering controller 166. The second controller 160 is an example of "a driving controller."

The first acquisition part 162 acquires the target trajectory TR from the target trajectory generating part 146, and stores the acquired target trajectory TR in a memory of the storage 180.

The speed controller 164 controls one or both of the traveling driving power output device 200 and the brake device 210 on the basis of the speed element (for example, the target speed v, the target acceleration a, or the like) included in the target trajectory TR stored in the memory.

The steering controller 166 controls the steering device 220 according to the position element included in the target trajectory stored in the memory (for example, a curvature κ of the target trajectory, a displacement amount u of the steering according to the position of the trajectory point, or the like).

Processing of the speed controller 164 and the steering controller 166 is realized by, for example, a combination of feedforward control and feedback control. As an example, the steering controller 166 combines and executes the feedforward control according to the curvature of the road in front of the host vehicle M and the feedback control based on the separation from the target trajectory TR.

The traveling driving power output device 200 outputs a traveling driving power (torque) to a driving wheel in order to cause the vehicle to travel. The traveling driving power output device 200 includes, for example, a combination of an internal combustion engine, an electric motor, and a gearbox, and a power electronic control unit (ECU) configured to control them. The power ECU controls the configuration according to the information input from the second controller 160 or the information input from the driving operator 80.

The brake device 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the second controller 160 or the information input from the driving operator 80 such that a brake torque according to the braking operation is output to the wheels. The brake device 210 may include a mechanism configured to transmit a hydraulic pressure, which is generated by an operation of the brake pedal included in the driving operator 80, to the cylinder via the master cylinder as a backup. Further, the brake device 210 is not limited to the above-mentioned configuration and may be an electronically controlled hydraulic brake device configured to control an actuator according to the information input from the second controller 160 and transmit a hydraulic pressure of the master cylinder to the cylinder.

The steering device 220 includes, for example, a steering ECU and an electric motor. The electric motor changes an orientation of a steered wheel by, for example, applying a force to a rack and pinion mechanism. A steering ECU drives the electric motor and changes an orientation of the steered wheel according to the information input from the second controller 160 or the information input from the driving operator 80.

[Processing Flow]

Figure 11:
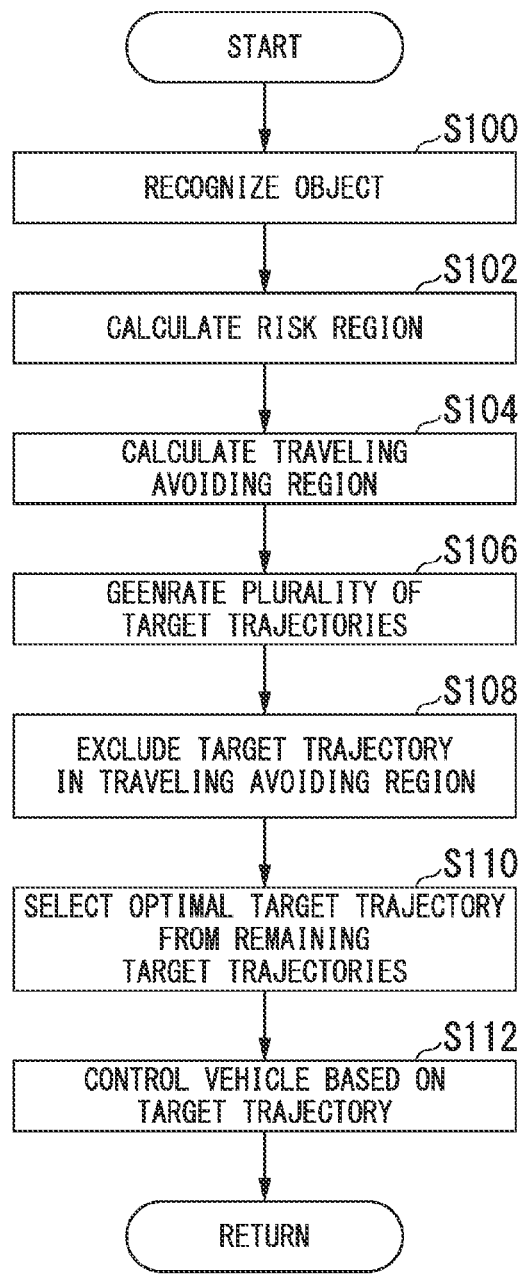
FIG. 11 is a flowchart showing an example of a series of processing flows by an automatic driving control device according to the embodiment.

Hereinafter, a series of processing flows by the automatic driving control device 100 according to the embodiment will be described using a flowchart. FIG. 11 is a flowchart showing an example of a series of processing flows by the automatic driving control device 100 according to the embodiment. Processing of the flowchart may be repeatedly performed at a predetermined period, for example, when the host vehicle M travels in the section determined through the lane change event by the event determining part 142 (i.e., when the lane change is performed). That is, processing of the flowchart may be repeatedly performed at a predetermined period when it is desired to displace the position of the host vehicle M in both of an advance direction X of the vehicle and a lane width direction Y.

First, the recognition part 130 recognizes an object present on a road along which the host vehicle M is traveling (step S100). The object may be various objects such as a road marking line on the road, a pedestrian, and an oncoming vehicle, as described above.

Next, the risk region calculating part 144 calculates the risk region RA on the basis of a position or a type of the road marking line, a position, a speed, an orientation, or the like, of another vehicle therearound (step S102).

For example, the risk region calculating part 144 divides a previously determined range into a plurality of meshes and calculates the risk potential p for each of the plurality of meshes. Then, the risk region calculating part 144 calculates the vector or the tensor corresponding to the risk potential p with respect to each mesh as the risk region RA. Here, the risk region calculating part 144 normalizes the risk potential p.

Next, the target trajectory generating part 146 calculates a region in which the host vehicle M should avoid to travel (hereinafter, referred to as a traveling avoidance region AA) (step S104).

For example, the target trajectory generating part 146 calculates a virtual line (hereinafter, referred to as a virtual line VL) passing through a reference point Pref using the host vehicle as a reference and an arbitrary point Px present in the vicinity of an outer edge of the object recognized by the recognition part 130, and calculates the virtual line VL passing through the reference point Pref and the point Py present in the vicinity of the outer edge of the object and different from the point Px. Any one of the point Px and the point Py is an example of "a first point" and the other is an example of "a second point."

The reference point may be, for example, an installation position or the like of the camera 10 attached to the front. For example, when the object is a polygonal shape such as a quadrangular shape, a hexagonal shape, or the like, the outer edge of the object may be an apex of the polygonal shape. That is, when the object is a polygonal shape, "the vicinity of the outer edge" may be read as "the vicinity of the apex" of the polygonal shape. In addition, when the object is a circular shape, the outer edge of the object may be a point of contact of a circle. That is, when the object is a circular shape, "the vicinity of the outer edge" may be read as "the vicinity of the point of contact" of a circular shape.

In addition, the virtual line VL may be calculated in consideration of the risk region RA. Specifically, the virtual line VL may be calculated so as to pass the position where the risk potential p is lower than a threshold th in the vicinity of the outer edge of the object and the above-mentioned reference point Pref.

Figure 12:
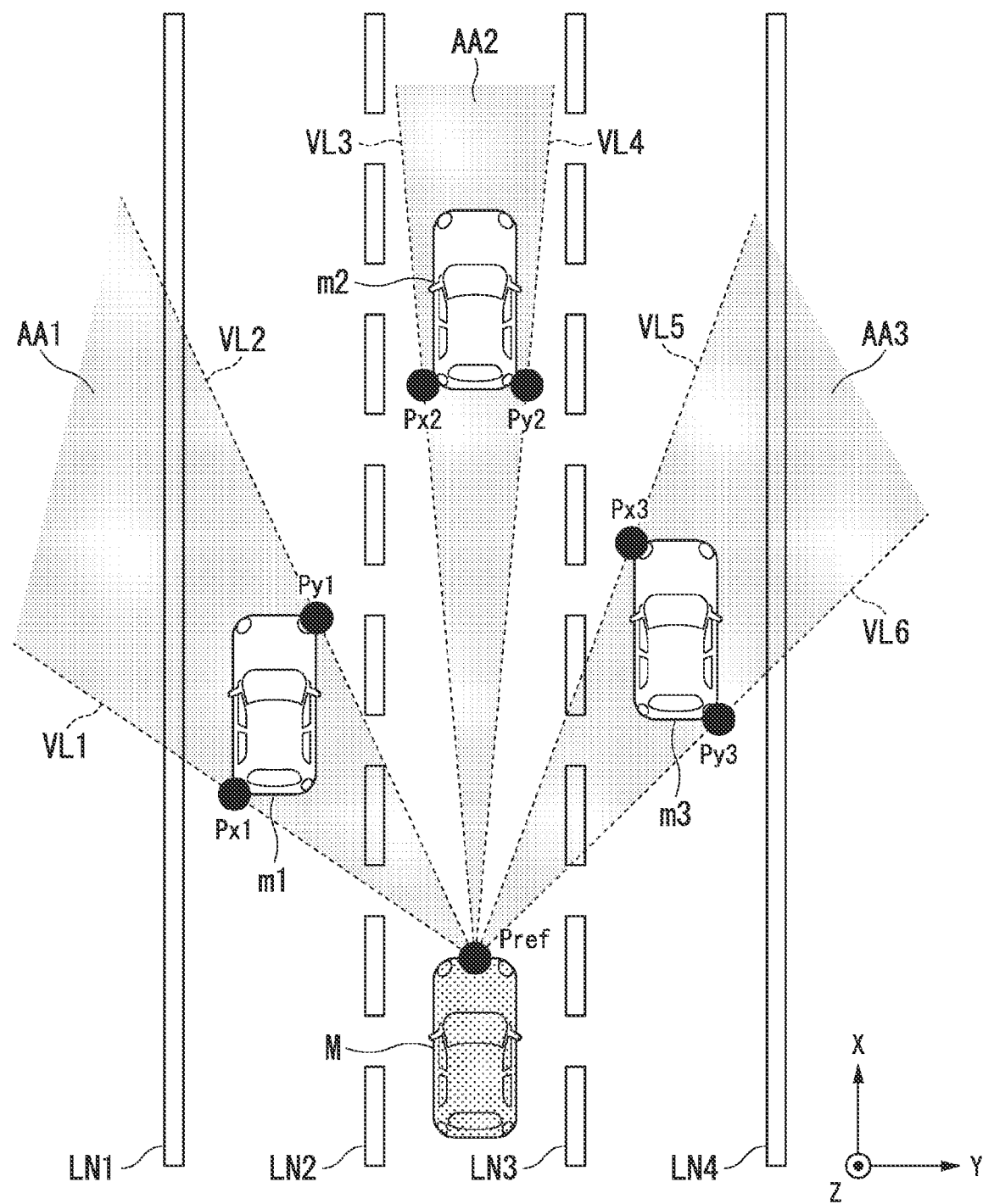
FIG. 12 is a view showing an example of a situation that a host vehicle can encounter.

FIG. 12 is a view showing an example of a situation that the host vehicle M can encounter. In the example shown, another vehicle m1 is present on a first traveling lane between the road marking lines LN1 and LN2, another vehicle m2 is present on a second traveling lane between the road marking lines LN2 and LN3, and another vehicle m3 is present on a third traveling lane between the road marking lines LN3 and LN4. The host vehicle M is present on the second traveling lane, and all other vehicles are also ahead of the host vehicle M.

In such a situation, the target trajectory generating part 146 sets the point Px1 and the point Py1 at a position in the vicinity of the boundary between a scene and the other vehicle m1 when a left front side is seen from the reference point Pref of the host vehicle M. Since the other vehicle m1 is a quadrangular shape, for example, in four corners (apexes) of the other vehicle m1, a left rear corner and a right front corner are outer edges of the other vehicle m1. Each corner of the other vehicle m1 is an example of "the vicinity of the outer edge of the object."

Accordingly, the target trajectory generating part 146 sets the point Px1 in the vicinity of the left rear corner, and sets the point Py1 in the vicinity of the right front corner. Here, the target trajectory generating part 146 may set the point Px1 and the point Py1 to a position closest to the outer edge of the other vehicle m1 and at which the risk potential p is lower than the threshold th in consideration of the risk region RA. Accordingly, the point Px1 and the point Py1 can be set to a position slightly deviated from the outer edge of the other vehicle m1, i.e., the vicinity of the outer edge as described above.

The target trajectory generating part 146 calculates the virtual line VL1 passing through the reference point Pref and the point Px1 and calculates the virtual line VL2 passing through the reference point Pref and the point Py1 when the point Px1 and the point Py1 are set. Then, the target trajectory generating part 146 calculates a region between the virtual line VL1 and the virtual line VL2 as a traveling avoidance region AA1.

The other vehicle m2 and m3 are also similar as described above. For example, the target trajectory generating part 146 sets the point Px2 and the point Py2 to a position in the vicinity of the boundary between the scenery and the other vehicle m2 when a forward side is seen from the reference point Pref of the host vehicle M. The outer edges of the other vehicle m2 are the left rear corner and the right rear corner among the four corners of the other vehicle m2. Accordingly, the target trajectory generating part 146 sets the point Px2 in the vicinity of the left rear corner and sets the point Py2 in the vicinity of the right rear corner. The target trajectory generating part 146 calculates the virtual line VL3 passing through the reference point Pref and the point Px2 and calculates the virtual line VL4 passing through the reference point Pref and the point Py2 when the point Px2 and the point Py2 are set. Then, the target trajectory generating part 146 calculates a region between the virtual line VL3 and the virtual line VL4 as a traveling avoidance region AA2.

In addition, for example, the target trajectory generating part 146 sets the point Px3 and the point Py3 to a position in the vicinity of the boundary between the scenery and the other vehicle m3 when a rightward side is seen from the reference point Pref of the host vehicle M. The outer edges of the other vehicle m3 are the left front corner and the right rear corner among the four corners of the other vehicle m3. Accordingly, the target trajectory generating part 146 sets the point Px3 in the vicinity of the left front corner and sets the point Py3 in the vicinity of the right rear corner. The target trajectory generating part 146 calculates the virtual line VL5 passing through the reference point Pref and the point Px3 and calculates the virtual line VL6 passing through the reference point Pref and the point Py3 when the point Px3 and the point Py3 are set. Then, the target trajectory generating part 146 calculates a region between the virtual line VL5 and the virtual line VL6 as a traveling avoidance region AA3.

Returning to description of the flowchart in FIG. 11, next, the target trajectory generating part 146 generates the plurality of target trajectories TR using the plurality of DNN models MDL1 defined by the DNN model data 182 (step S106).

Next, the target trajectory generating part 146 excludes the target trajectory TR present inside each of the traveling avoidance regions AA from the plurality of target trajectories TR that were generated, and leaves the target trajectory TR present outside the traveling avoidance region AA (step S108).

Figure 13:
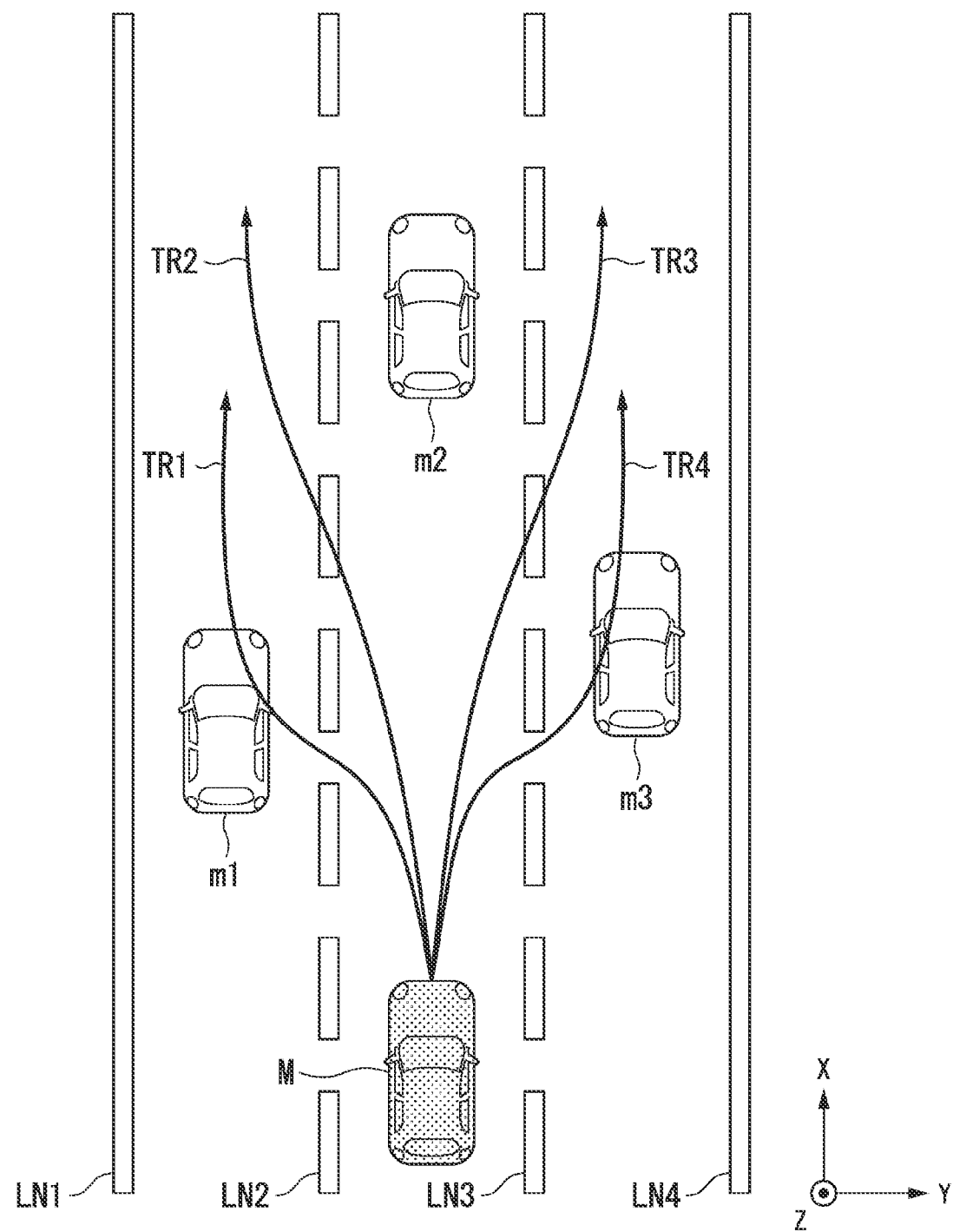
FIG. 13 is a view showing an example of a plurality of target trajectories.

FIG. 13 is a view showing an example of the plurality of target trajectories TR. For example, when the four DNN models MDL1 are defined by the DNN model data 182, the target trajectory generating part 146 inputs the risk region RA calculated by the risk region calculating part 144 through processing of S102 to each of the four DNN models MDL1. In response to this, each of the DNN models MDL1 outputs one target trajectory TR. That is, as shown, the total four target trajectories TR referred to as TR1, TR2, TR3 and TR4 are generated.

As described above, the DNN models MDL1 are learned using instructor data in which the target trajectory TR, which is a correct answer (a track passing a region in which the risk potential p is lower than the threshold Th), is associated with the risk region RA as an instructor label. That is, a parameter such as a weight coefficient, a bias element, or the like, of the DNN model MDL1 is determined using a stochastic gradient descent method or the like such that a difference (an error) between the target trajectory TR output by the DNN model MDL1 when a certain risk region RA is input and the correct answer target trajectory TR associated with the risk region RA as an instructor label is reduced.

For this reason, the DNN model MDL1 behaves as a kind of stochastic model. The target trajectory TR output by the DNN model MDL1 is expected to be a track so as to pass a region having the risk potential p lower than the threshold Th. However, since the DNN model MDL1 determines the target trajectory TR probabilistically, its probability is extremely low, but it cannot be denied that possibility of a track such as passing a region having the risk potential p higher than the threshold Th being generated. That is, as shown, the target trajectory TR1 or TR4 may be generated in which the host vehicle M will suddenly approach the other vehicle m1 or m2.

For this reason, the target trajectory generating part 146 determines whether each of the generated target trajectories TR is present inside or outside the calculated traveling avoidance region AA, excludes the target trajectory TR present inside the traveling avoidance region AA, and leaves the target trajectory TR present outside the traveling avoidance region AA.

Figure 14:
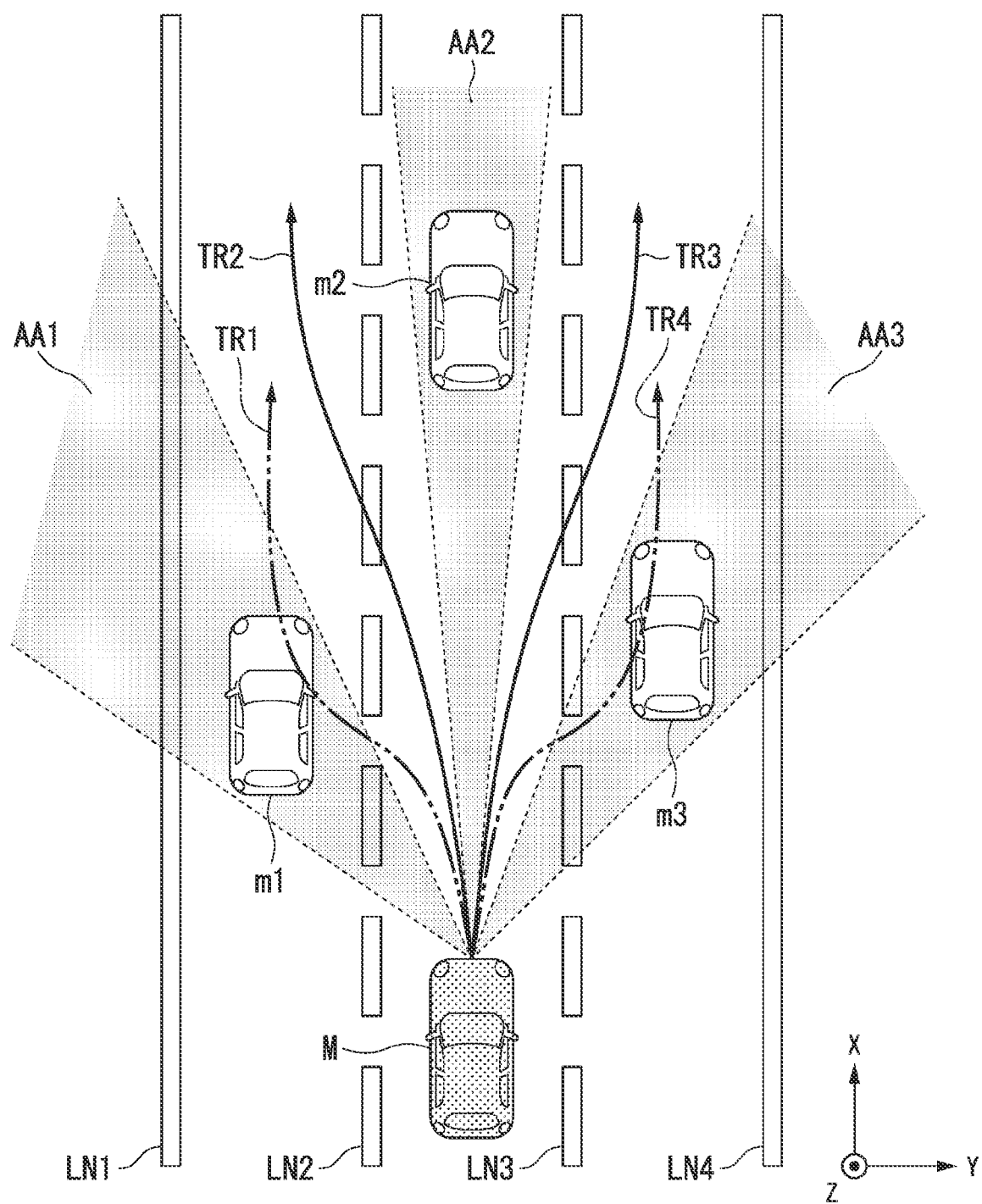
FIG. 14 is a view showing an example of excluded target trajectories.

FIG. 14 is a view showing an example of the excluded target trajectory TR. In the example shown, in the four target trajectories TR, TR1 is present inside the traveling avoidance region AA1 and TR4 is present inside the traveling avoidance region AA3. In this case, the target trajectory generating part 146 excludes the target trajectory TR1 and TR4.

Returning to description of the flowchart of FIG. 11, next, the target trajectory generating part 146 selects an optimal target trajectory TR from one or a plurality of target trajectories TR remained while not being excluded (step S110).

For example, the target trajectory generating part 146 may evaluate each target trajectory TR from the viewpoint of smoothness of the target trajectory TR or gradual acceleration/deceleration, and select the target trajectory TR with a higher evaluation as an optimal target trajectory TR. More specifically, the target trajectory generating part 146 may select the target trajectory TR having the smallest curvature κ and the smallest target acceleration a as an optimal target trajectory TR. Further, selection of the optimal target trajectory TR is not limited thereto, and may be performed in consideration of other viewpoints.

Then, target trajectory generating part 146 outputs the optimal target trajectory TR to the second controller 160. In response to this, the second controller 160 controls at least one of the speed and the steering of the host vehicle M on the basis of the optimal target trajectory TR output by the target trajectory generating part 146 (step S112). Accordingly, processing of the flowchart is terminated.

According to the above-mentioned embodiment, the automatic driving control device 100 recognizes various objects referred to as a road marking line, an oncoming vehicle, and a pedestrian present around the host vehicle M, and calculates a region of a risk present around the object potentially as the risk region RA. Further, the automatic driving control device 100 calculates the virtual line VL passing through the reference point Pref using the host vehicle M as a reference and the point Px present in the vicinity of the outer edge of the object, and the virtual line VL passing through the reference point Pref and the point Py present in the vicinity of the outer edge of the object and different from the point Px. The automatic driving control device 100 calculates a region between the two virtual lines VL that were calculated as the traveling avoidance region AA. The automatic driving control device 100 excludes the target trajectory TR present inside the calculated traveling avoidance region AA from one or a plurality of target trajectories TR that were generated, and automatically controls driving of the host vehicle M on the basis of the target trajectory TR that was remained without being excluded. Accordingly, driving of the host vehicle M can be more stably controlled.

Variant of Embodiment

Hereinafter, a variant of the above-mentioned embodiment will be described. In the above-mentioned embodiment, while the target trajectory generating part 146 is described as outputting the target trajectory TR to each of the plurality of DNN models MDL1 by inputting the risk region RA to each of the plurality of DNN models MDL1, it is not limited thereto. For example, the target trajectory generating part 146 may input the risk region RA to a certain one of the DNN models MDL1, and may cause the DNN models MDL1 to output the plurality of target trajectories TR. In this case, the DNN models MDL1 are learned on the basis of the instructor data in which the plurality of target trajectories TR, which are correct answers that should be output by the DNN models MDL1, are associated with a certain risk region RA as an instructor label. Accordingly, the DNN models MDL1 outputs the plurality of target trajectories TR when a certain risk region RA is input.

In addition, in the above-mentioned embodiment, while the preceding vehicle such as the other vehicle m2 has been described as calculating the traveling avoidance region AA, it is not limited thereto. For example, when the host vehicle M travels in a section in which not only the lane change event but also a following traveling event or another event is planned, the target trajectory generating part 146 may not calculate a region behind the preceding vehicle as the traveling avoidance region AA in the section.

Figure 15:
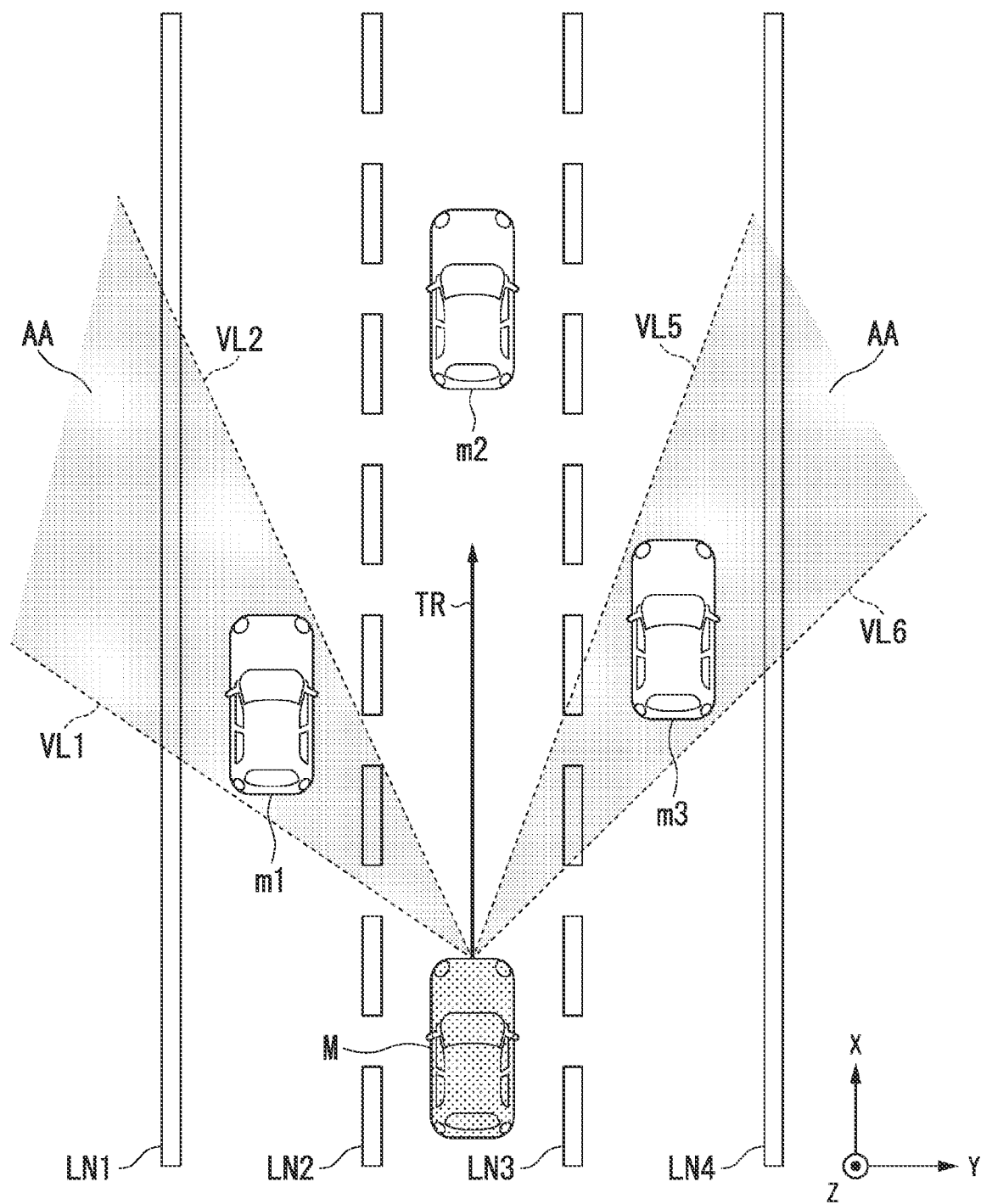
FIG. 15 is a view showing another example of a situation that a host vehicle can encounter.

FIG. 15 is a view showing another example of a situation that the host vehicle M can encounter. For example, in the situation shown, when the host vehicle M follows the other vehicle m2 that is a preceding vehicle, the target trajectory TR is a track extending from the host vehicle M to the other vehicle m2. In this case, when the region behind the other vehicle m2 is set as the traveling avoidance region AA, the host vehicle M may not be able to follow the other vehicle m2. Accordingly, in the situation in which the lane changes may not be made, the target trajectory generating part 146 does not calculate the region behind the preceding vehicle as the traveling avoidance region AA. Accordingly, it is possible to control the driving of the host vehicle M more safely while avoiding the situation in which the host vehicle M is stuck.

In addition, in the above-mentioned embodiment, while the target trajectory generating part 146 calculates the virtual line VL to pass the vicinity of the outer edge of the object (for example, the vicinity of the corner of the vehicle) in order to calculate the traveling avoidance region AA, it is not limited thereto. For example, the target trajectory generating part 146 may calculate the virtual line VL on the basis of the risk potential p around the object.

Figure 16:
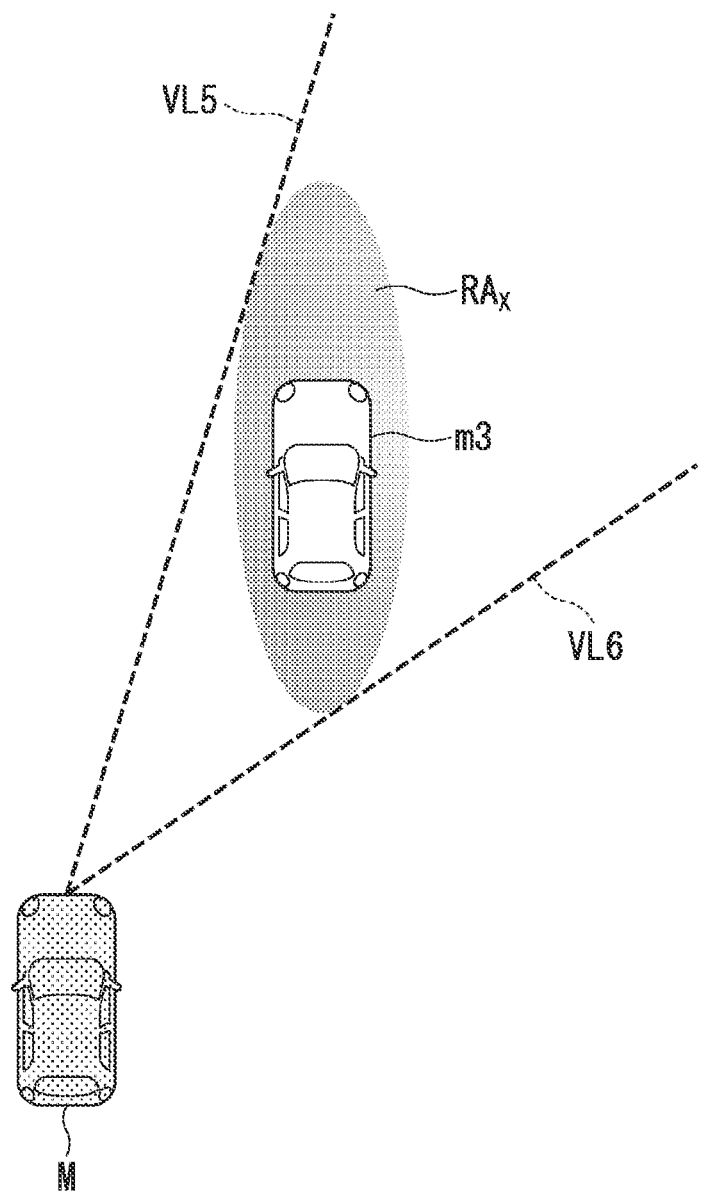
FIG. 16 is a view for describing a calculating method of a virtual line.

FIG. 16 is a view for describing a calculation method of the virtual line VL. In the example shown, a calculation method of the virtual line VL5 and VL6 with respect to the other vehicle m3 will be described. $RA_X$ in the drawing designates a region in which the risk potential p is higher than the threshold th. As described above, the region closer to the other vehicle m3 has a higher risk potential p, and the region nearer to the other vehicle m3 has lower risk potential p. From this, the region $RA_X$ is a region larger than the other vehicle m3. The inside of the region $RA_X$ is regarded as a region through which the host vehicle M should not pass because the risk potential p is high. Accordingly, the target trajectory generating part 146 may calculate a straight line that passes through the outer edge of the region $RA_X$ which uses the other vehicle m3 as a reference (a boundary at which the risk potential p is equal to or smaller than the threshold th) as the virtual lines VL5 and VL6. In other words, the target trajectory generating part 146 may calculate a straight line that passes through a position separated from each corner of the other vehicle m3 when seen from the other vehicle m3 as the virtual line VL5 and VL6. Accordingly, the traveling avoidance region AA can be calculated dynamically while considering the future movement of the other vehicle m3. The position separated from each corner of the other vehicle m3 is another example of "the vicinity of the outer edge of the object."

In addition, the target trajectory generating part 146 may calculate the traveling avoidance region AA while changing the virtual line VL calculated on the basis of the risk potential p in the vicinity of the object to an optimized shape using an optimization method such as model predictive control (MPC) or the like.

Figure 17:
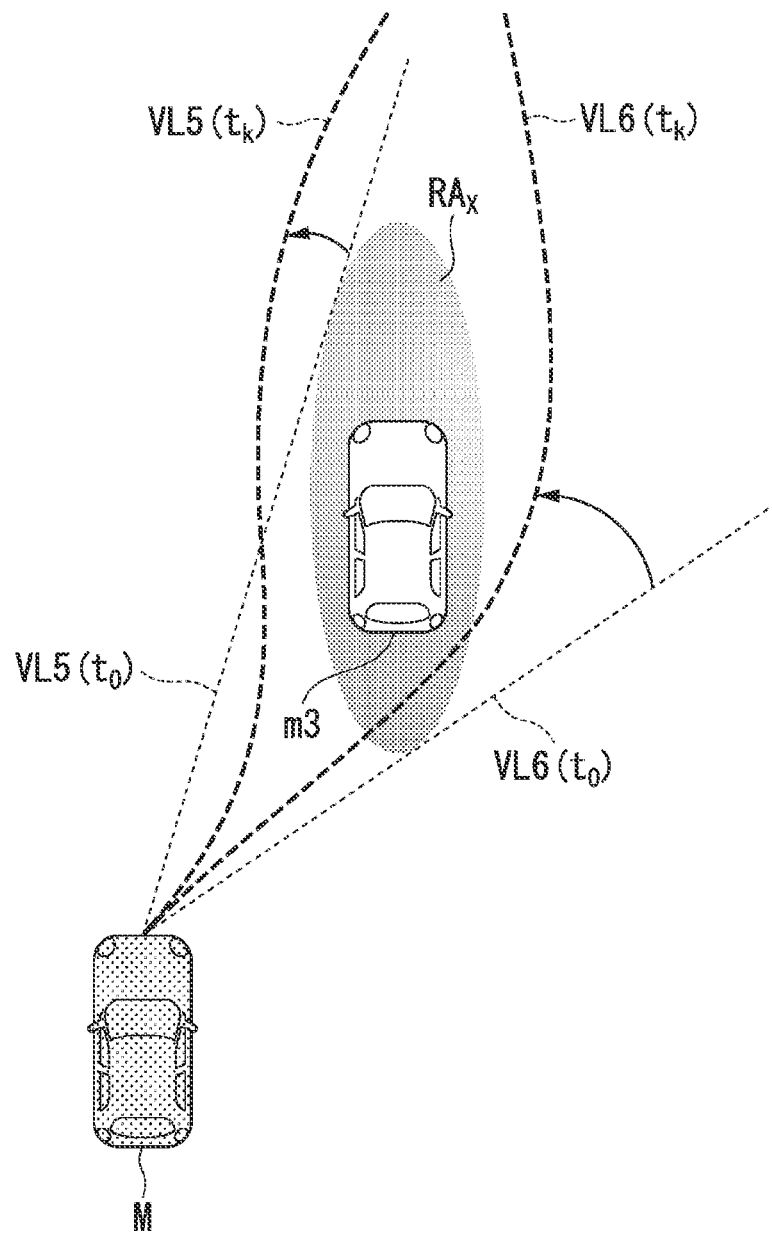
FIG. 17 is a view for describing an optimization method of a virtual line.

FIG. 17 is a view for describing an optimization method of the virtual line VL. For example, the risk potential p around the other vehicle m3 is calculated at a certain initial cycle $t_0$, and virtual lines VL5 ($t_0$) and VL6 ($t_0$) with respect to the other vehicle m3 are calculated on the basis of the risk potential p. In this case, the target trajectory generating part 146 may calculate the virtual lines VL5 and VL6 by solving an arbitrary optimization problem whenever a processing cycle is repeated and the risk potential p is calculated. Accordingly, as shown, virtual lines VL5 ($t_k$) and VL6 ($t_k$) at a certain cycle $t_k$ can be calculated as virtual lines with a non-linear shape rather than a linear shape, and the traveling avoidance region AA with an optimal shape having considering the future movement of the other vehicle m3 can be calculated. As a result, since the optimal target trajectory TR can be easily selected, driving of the host vehicle M can be more safely controlled.

In addition, the target trajectory generating part 146 of the above-mentioned embodiment is not limited to the DNN, and may output the target trajectory TR to another machine learning model by inputting the risk region RA to a model using another machine learning as a base, for example, a binary tree type model, a game tree type model, a model in which bottom layer neural networks are coupled to each other like a Boltzmann machine, a reinforcement learning model, a deep reinforcement learning model, or the like. The binary tree type model, the game tree type model, the model in which bottom layer neural networks are coupled to each other like a Boltzmann machine, the reinforcement learning model, the deep reinforcement learning model, or the like, is another example of "a machine learning model."

[Hardware Configuration]

Figure 18:
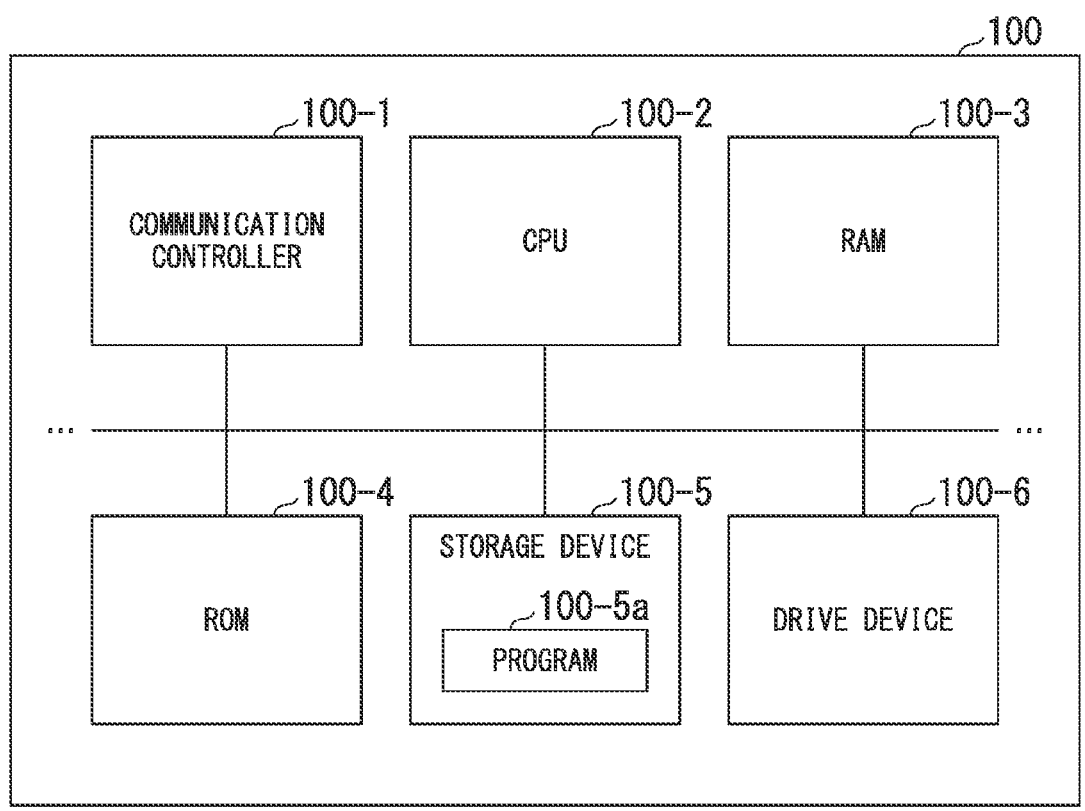
FIG. 18 is a view showing an example of a hardware configuration of an automatic driving control device of the embodiment.

FIG. 18 is a view showing an example of a hardware configuration of the automatic driving control device 100 of the embodiment. As shown, the automatic driving control device 100 has a configuration in which a communication controller 100-1, a CPU 100-2, a RAM 100-3 used as a working memory, a ROM 100-4 configured to store a booting program or the like, a storage device 100-5 such as a flash memory, an HDD, or the like, a drive device 100-6, and the like, are connected to each other by an internal bus or a dedicated communication line. The communication controller 100-1 performs communication with components other than the automatic driving control device 100. A program 100-5a executed by the CPU 100-2 is stored in the storage device 100-5. The program is developed in the RAM 100-3 by a direct memory access (DMA) controller (not shown) or the like, and executed by the CPU 100-2. Accordingly, some or all of the first controller and the second controller 160 are realized.

The above-mentioned embodiment can be expressed as follows.

A vehicle control device is configured to include:

at least one memory in which a program is stored; and at least one processor, wherein the processor executes the program to:

recognize an object present around a vehicle;

generate one or a plurality of target trajectories along which the vehicle is to travel on the basis of the recognized object;

automatically control driving of the vehicle on the basis of the generated target trajectory;

calculate a region between a first virtual line, which passes through a reference point using the vehicle as a reference and a first point present in the vicinity of an outer edge of the recognized object, and a second virtual line, which passes through the reference point and a second point present in the vicinity of the outer edge of the object and different from the first point, as a traveling avoidance region that is a region through which traveling of the vehicle should be avoided, and exclude the target trajectory present in the calculated traveling avoidance region from the one or the plurality of target trajectories that were generated; and automatically control the driving of the vehicle on the basis of the target trajectory remained while being not excluded.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control method, comprising:

recognizing an object present around a vehicle;

generating one or a plurality of target trajectories along which the vehicle is to travel on the basis of the recognized object;

automatically controlling driving of the vehicle on the basis of the generated target trajectory;

calculating a region between a first virtual line, which passes through a reference point using the vehicle as a reference and a first point present in the vicinity of an outer edge of the recognized object, and a second virtual line, which passes through the reference point and a second point present in the vicinity of the outer edge of the object and different from the first point, as a traveling avoidance region that is a region through which traveling of the vehicle should be avoided, and excluding the target trajectory present in the calculated traveling avoidance region from the one or the plurality of target trajectories that were generated; and automatically controlling the driving of the vehicle on the basis of a remaining target trajectory remained without being excluded.

2. The vehicle control method according to claim 1, further comprising:

optimizing shapes of the first virtual line and the second virtual line on the basis of model prediction control.

3. The vehicle control method according to claim 1, further comprising:

calculating a risk region that is a region of a risk distributed around the object, and inputting the risk region to a model that determines the target trajectory according to the risk region, and generating the one or the plurality of target trajectories on the basis of an output result of the model to which the risk region has been input.

4. The vehicle control method according to claim 3, wherein the model is a machine learning model learned to output the target trajectory when the risk region is input.

5. The vehicle control method according to claim 3, further comprising:

setting a position at which a potential of the risk is lower than a threshold in the vicinity of the outer edge of the object in the risk region as the first point and the second point.

6. The vehicle control method according to claim 1, wherein, when the object recognized is a preceding vehicle that is traveling in front of the vehicle in a lane on which the vehicle is present, a setting of a region behind the preceding vehicle as the traveling avoidance region is not performed.

7. The vehicle control method according to claim 1, wherein, when a lane change of the vehicle is performed, a calculation of the traveling avoidance region, and an exclusion of the target trajectory present in the traveling avoidance region from the one or the plurality of target trajectories that were generated, are performed.

8. A vehicle control device, comprising:

a hardware processor executing software, hardware including circuitry, or a cooperation of the software and the hardware configured to operate as:

a recognition part configured to recognize an object present around a vehicle;

a generating part configured to generate one or a plurality of target trajectories along which the vehicle is to travel on the basis of the object recognized by the recognition part; and a driving controller configured to automatically control driving of the vehicle on the basis of the target trajectory generated by the generating part, wherein the generating part calculates a region between a first virtual line, which passes through a reference point using the vehicle as a reference and a first point present in the vicinity of an outer edge of the object recognized by the recognition part, and a second virtual line, which passes through the reference point and a second point present in the vicinity of the outer edge of the object and different from the first point, as a traveling avoidance region that is a region through which traveling of the vehicle should be avoided, and excludes the target trajectory present in the calculated traveling avoidance region from the one or the plurality of target trajectories that were generated, and the driving controller automatically controls driving of the vehicle on the basis of a remaining target trajectory remained without being excluded by the generating part.

9. A non-transitory computer-readable storage medium on which a program is stored to execute a computer mounted on a vehicle to:

recognize an object present around the vehicle;

generate one or a plurality of target trajectories along which the vehicle is to travel on the basis of the recognized object;

automatically control driving of the vehicle on the basis of the generated target trajectory;

calculate a region between a first virtual line, which passes through a reference point using the vehicle as a reference and a first point present in the vicinity of an outer edge of the recognized object, and a second virtual line, which passes through the reference point and a second point present in the vicinity of the outer edge of the object and different from the first point, as a traveling avoidance region that is a region through which traveling of the vehicle should be avoided, and exclude the target trajectory present in the calculated traveling avoidance region from the one or the plurality of target trajectories that were generated; and automatically control the driving of the vehicle on the basis of a remaining target trajectory remained without being excluded.

10. A vehicle control method, comprising:

recognizing an object present around a vehicle;

automatically controlling driving of the vehicle on the basis of at least the recognized object;

calculating a region between a first virtual line, which passes through a reference point using the vehicle as a reference and a first point present in the vicinity of an outer edge of the recognized object, and a second virtual line, which passes through the reference point and a second point present in the vicinity of the outer edge of the object and different from the first point, as a traveling avoidance region that is a region through which traveling of the vehicle should be avoided;

optimizing shapes of the first virtual line and the second virtual line on the basis of model prediction control; and automatically controlling the driving of the vehicle to avoid traveling through the traveling avoidance region.

* * * * *